United States Patent
Brasch et al.

(10) Patent No.: US 10,107,317 B1
(45) Date of Patent: *Oct. 23, 2018

(54) BARBELL COLLAR SYSTEM

(71) Applicant: PRx Performance, LLC, Fargo, ND (US)

(72) Inventors: Brian B. Brasch, Fargo, ND (US); Erik S. Hopperstad, Moorhead, MN (US)

(73) Assignee: PRx Performance, LLC, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,469

(22) Filed: Aug. 6, 2018

Related U.S. Application Data

(63) Continuation-in-part of application No. 15/191,227, filed on Jun. 23, 2016, now Pat. No. 10,039,949.

(60) Provisional application No. 62/183,473, filed on Jun. 23, 2015.

(51) Int. Cl.
| | |
|---|---|
| *A63B 21/072* | (2006.01) |
| *A63B 21/078* | (2006.01) |
| *A41F 1/00* | (2006.01) |
| *F16B 1/00* | (2006.01) |
| *F16B 2/08* | (2006.01) |

(52) U.S. Cl.
CPC ............ *F16B 2/08* (2013.01); *A63B 21/0724* (2013.01); *A63B 21/0783* (2015.10); *A41F 1/002* (2013.01); *F16B 1/00* (2013.01); *F16B 2001/0035* (2013.01)

(58) Field of Classification Search
CPC .............. A63B 21/072; A63B 21/0726; A63B 21/0728; F16B 2/08
See application file for complete search history.

(56) References Cited

U.S. PATENT DOCUMENTS

| | | |
|---|---|---|
| 3,738,529 A | 6/1973 | Rose |
| 5,373,942 A | 12/1994 | Weder |
| 5,738,398 A | 4/1998 | Miano |
| 5,745,920 A | 5/1998 | Olivier |
| 5,845,804 A | 12/1998 | Prescott |
| 5,857,217 A | 1/1999 | Hsueh |

(Continued)

OTHER PUBLICATIONS http://www.getsnapclips.com; Snap Clips Product Website; Received and Printed Jun. 22, 2016.

(Continued)

*Primary Examiner* — Jennifer M Deichl
(74) *Attorney, Agent, or Firm* — Neustel Law Offices

(57) ABSTRACT

A barbell collar system which is both easy to connect or disconnect from the barbell and secure enough to maintain weights on a barbell during extreme use. The barbell collar system generally includes a collar which is adapted to easily and quickly be connected to or removed from a barbell to retain a weight on the barbell. The collar is adapted to adjust between a first position in which the collar is curled around the barbell outside of the weight and a second position in which the collar is elongated in a linear orientation. The collar may include a ribbon spring for snapping between the two positions and an outer covering for increasing friction between the collar and the barbell. One or more magnets may be included with the collar to magnetically engage the collar with the barbell or the collar with itself.

20 Claims, 35 Drawing Sheets

(56) References Cited

U.S. PATENT DOCUMENTS

| | | |
|---|---|---|
| 6,220,916 B1 | 4/2001 | Bart |
| 6,425,494 B1 | 7/2002 | Woods, II |
| 6,564,385 B2 | 5/2003 | McCarthy |
| 6,829,863 B2 | 12/2004 | Lovas |
| 7,004,889 B2 | 2/2006 | McBride |
| 7,494,451 B1 | 2/2009 | Ramos |
| 8,162,383 B2 | 4/2012 | Curtis |
| 8,747,284 B2 | 6/2014 | Ingram |
| 9,371,118 B2 | 6/2016 | King |
| 9,662,530 B2 * | 5/2017 | Dimitrov ............ A63B 21/0728 |
| 2001/0052710 A1 * | 12/2001 | Witherell ............. A63B 21/072 |
| | | 294/137 |
| 2003/0155389 A1 | 8/2003 | Swartzentruber |
| 2004/0014384 A1 | 1/2004 | Sloot |
| 2012/0228318 A1 | 9/2012 | Martin |
| 2013/0331236 A1 | 12/2013 | Moss |
| 2015/0057133 A1 | 2/2015 | Nguyen |
| 2016/0003269 A1 | 1/2016 | Russell-Clarke |
| 2016/0356293 A1 | 12/2016 | Dimitrov |

OTHER PUBLICATIONS https://www.kickstarter.com/projects/523653169/snapclips; SnapClips Kickstarter Project Campaign Website; Received and Printed Jun. 22, 2016.

\* cited by examiner

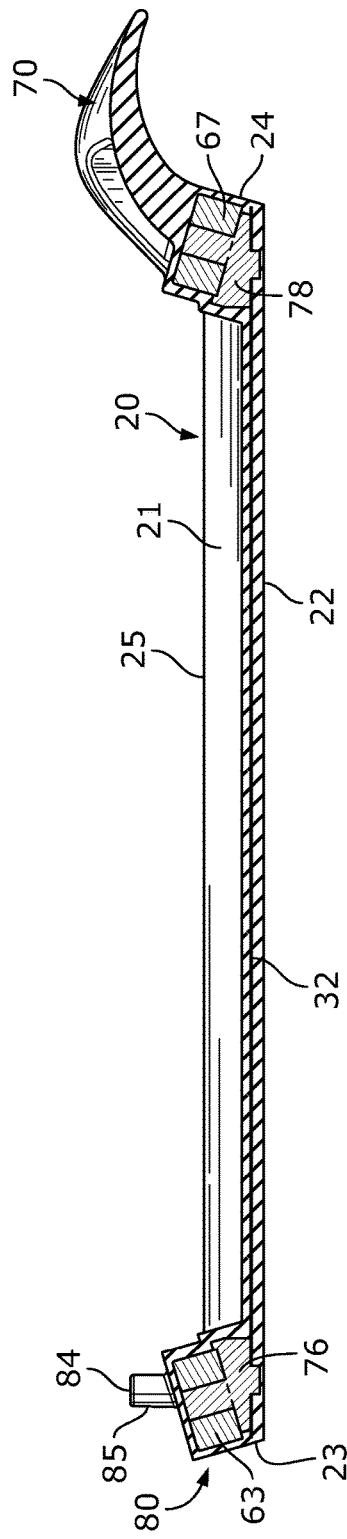
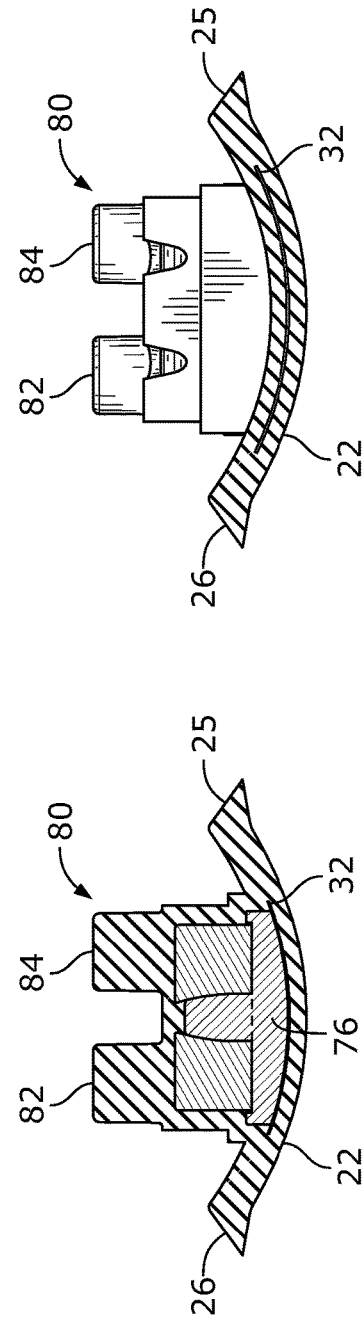

BARBELL COLLAR SYSTEM

CROSS REFERENCE TO RELATED APPLICATIONS

The present application is a continuation-in-part of U.S. application Ser. No. 15/191,227 filed on Jun. 23, 2016 which issues as U.S. patent Ser. No. 10/039,949 on Aug. 7, 2018, which claims priority to U.S. Provisional Application No. 62/183,473 filed Jun. 23, 2015. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a barbell collar system which is both easy to connect or disconnect from the barbell and secure enough to maintain weights on a barbell during extreme use.

Related Art

Any discussion of the related art throughout the specification should in no way be considered as an admission that such related art is widely known or forms part of common general knowledge in the field.

Exercise has skyrocketed in popularity over the last decades due to an increasing public awareness of the effects of lack of exercise on one's wellbeing. With an increase in exercise, the use of weight training is also on the rise. Many popular methods of weight training revolve around the use of a barbell on which is secured one or more weights, typically on one or both ends of the barbell.

Weights and barbells have been in use for many years. Typically, the weights are removably secured onto the barbell so that the weights may be interchanged to provide varying resistances during weight training. Common systems for securely retaining the weights on the barbell during use include clips and the like. These previously-existing systems and methods for securing weights on a barbell often suffer from either being insecure and allowing slippage, or being complicated to connect to or disconnect from the barbell.

SUMMARY

An example embodiment of the present invention is directed to a barbell collar system. The barbell collar system includes a collar which is adapted to easily and quickly be connected to or removed from a barbell to retain a weight on the barbell. The collar is adapted to adjust between a first position in which the collar is curled around the barbell outside of the weight and a second position in which the collar is elongated in a linear orientation. The collar may include a ribbon spring for snapping between the two positions and an outer covering for increasing friction between the collar and the barbell. One or more magnets may be included with the collar to magnetically engage the collar with the barbell or the collar with itself.

There has thus been outlined, rather broadly, some of the embodiments of the Barbell Collar System in order that the detailed description thereof may be better understood, and in order that the present contribution to the art may be better appreciated. There are additional embodiments of the Barbell Collar System that will be described hereinafter and that will form the subject matter of the claims appended hereto. In this respect, before explaining at least one embodiment of the Barbell Collar System in detail, it is to be understood that the Barbell Collar System is not limited in its application to the details of construction or to the arrangements of the components set forth in the following description or illustrated in the drawings. The Barbell Collar System is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 40 is a cross sectional view taken along line 40-40 of FIG. 34.

FIG. 41 is a cross sectional view taken along line 41-41 of FIG. 34.

FIG. 42 is a cross sectional view taken along line 42-42 of FIG. 34.

FIG. 43 is a cross sectional view taken along line 43-43 of FIG. 33a.

DETAILED DESCRIPTION

A. Overview

Figure 1:
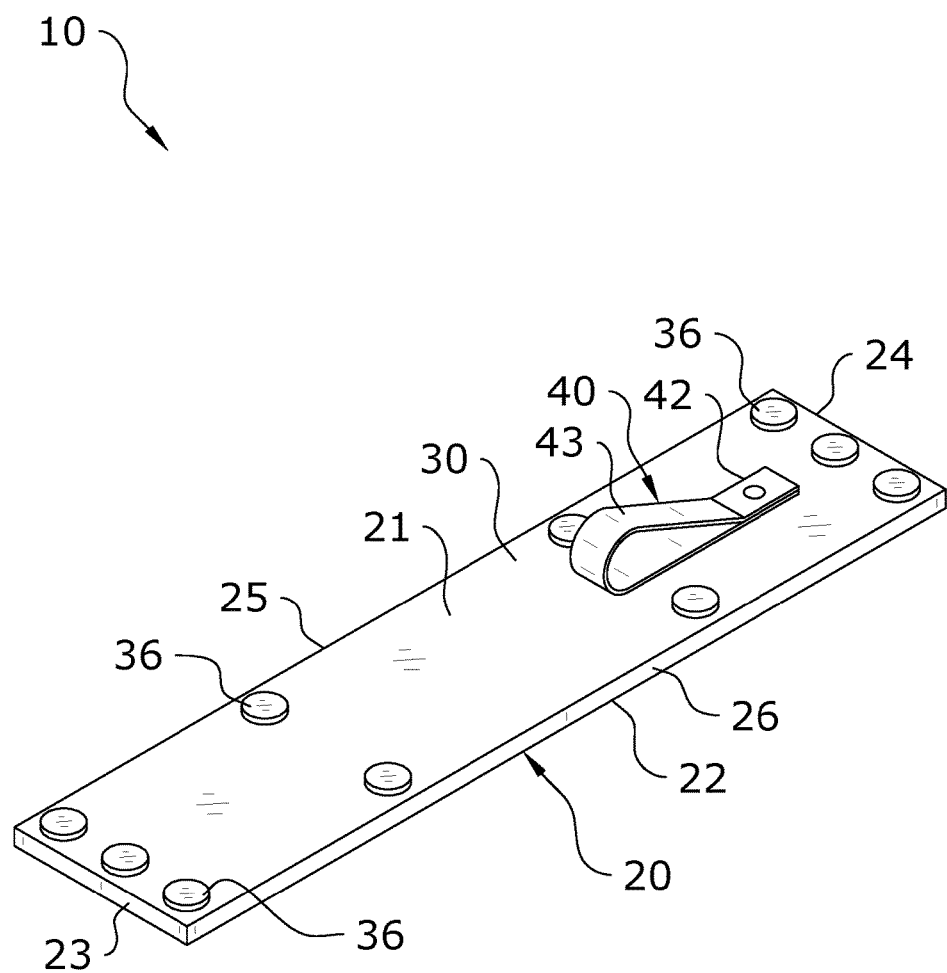
FIG. 1 is a first upper perspective view of a barbell collar system in accordance with a first example embodiment.

An example barbell collar system generally comprises a collar 20 for retaining weights 13 on a barbell 12 (e.g. standard bar, Olympic weightlifting bar, trap bar, safety squat bar, cambered bar, Swiss bar, curl bar). The collar 20 is adjustable between a first position in which the first end 23 and the second end 24 of the collar 20 are each curled inwardly to secure the collar 20 around the barbell 12 and a second position in which the collar 20 is elongated in a linear orientation. The collar 20 may comprise a ribbon spring 32 and an outer covering 30 which at least partially covers the ribbon spring 32. The outer covering 30 may be comprised of rubber, silicone (e.g. compression molded silicone), non-slip vinyl, thermoplastic elastomer (TPE) or any other non-slip material which will increase friction between the collar 20 and the barbell 12.

The collar 20 may include one or more magnets 34 to magnetically engage the collar 20 with the collar of the barbell 12 and/or to magnetically engage the first end 23 of the collar 20 with the second end 24 of the collar 20. The collar 20 may include an outer surface 21 and an inner surface 22, with the inner surface 22 of the collar 20 being adapted to magnetically engage with the barbell 12. In some embodiments, there may be a plurality of magnets 34 on the inner surface 22 of the collar 20 to magnetically connect to the metal collar of the barbell 12. In other embodiments, there may be one or more magnets on both the inner surface 22 and the outer surface of the collar 20 that magnetically connect to one another when the collar 20 is overlapping itself on the collar of the barbell. A handle 40 may also extend from the outer surface 21 of the collar 20 to aid in removing, carrying and/or adjusting the collar 20. The collar 20 may also include metal at one end 23 instead of a magnet so that the magnet 34 at the opposite end 24 magnetically connects to the metal.

The collar 20 may be concave in its elongated position, or may be completely linear. When the collar 20 is dimpled or contacted on its inner surface 22, it will coil upon itself, hence, taking the opposite shape. While the collar 20 is in the engaged position, the magnets 34 help adhere the outer covering 30 to the barbell 12. Because of the torque of the collar 20, the magnets 34, and the outer covering 30, the collar 20 adheres and grasps the barbell 12 evenly. One should note, in the elongated position, one end 23 of the collar 20 may be adhered to the barbell 12 or any nearby metal object as storage as weights 13 are changed.

B. Collar

As shown throughout the figures, a collar 20 is provided which is adapted to be removably secured around a barbell 12 to secure a weight 13 on the barbell 12. The collar 20 will preferably be adjustable between at least a first position and a second position. The first position comprises a curled configuration as shown in FIGS. 8, 10, 14, 23, 29 in which the collar 20 is wrapped around the barbell 12 to secure the weight 13 around the barbell 12. The second position comprises an elongated configuration as best shown in FIGS. 1-7 in which the collar 20 is elongated in a linear orientation between uses. Preferably, the collar 20 will be adapted to "snap" between the first position and the second position as described herein.

Figure 8:
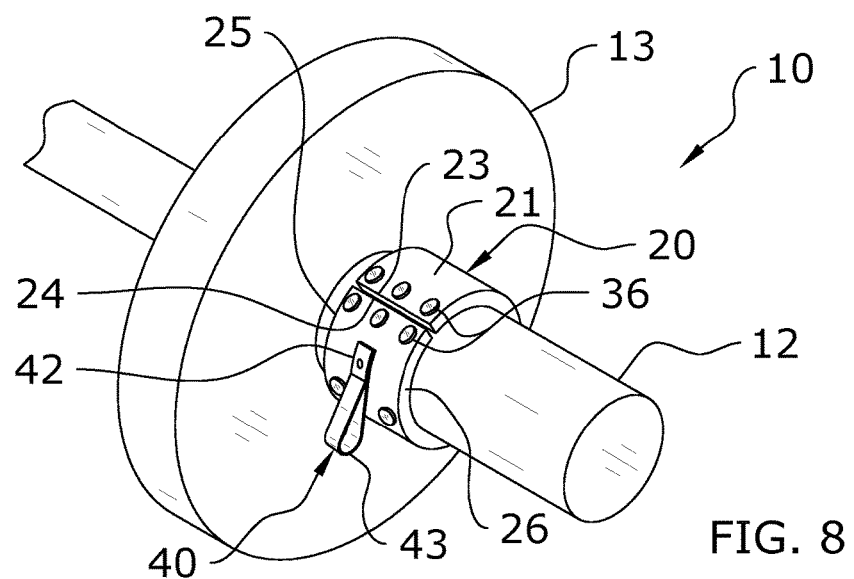
FIG. 8 is an upper perspective view of a barbell collar system installed on a barbell in accordance with a first example embodiment.
Figure 10:
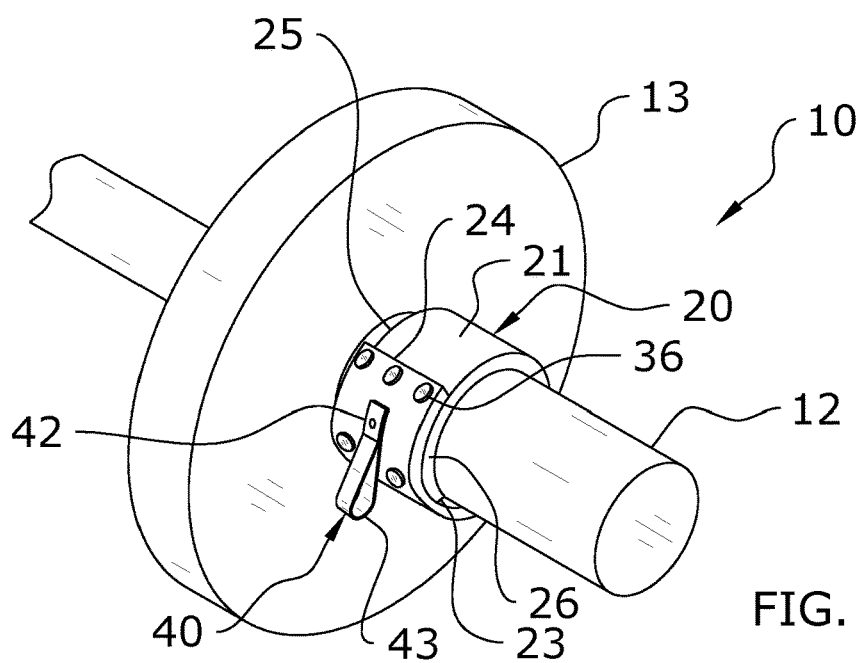
FIG. 10 is an upper perspective view of a barbell collar system installed on a barbell such that the collar connects to itself in accordance with a first example embodiment.
Figure 11:
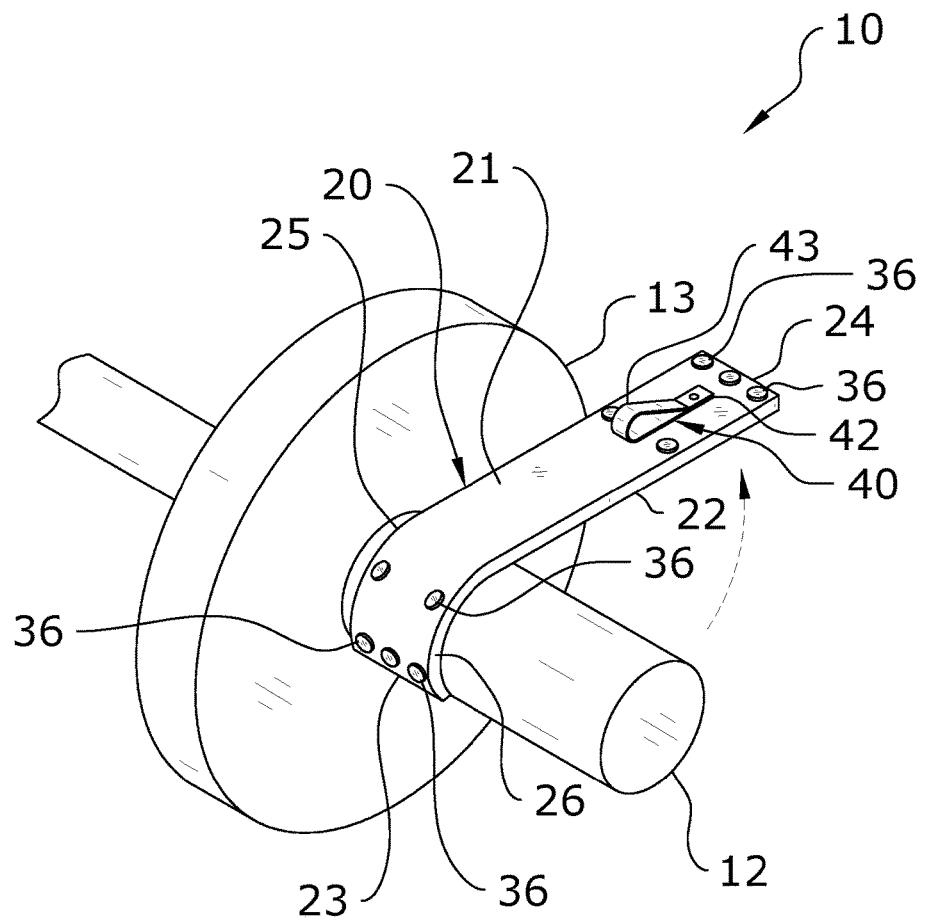
FIG. 11 is an upper perspective view of a barbell collar system being removed from a barbell in accordance with a first example embodiment.
Figure 29:
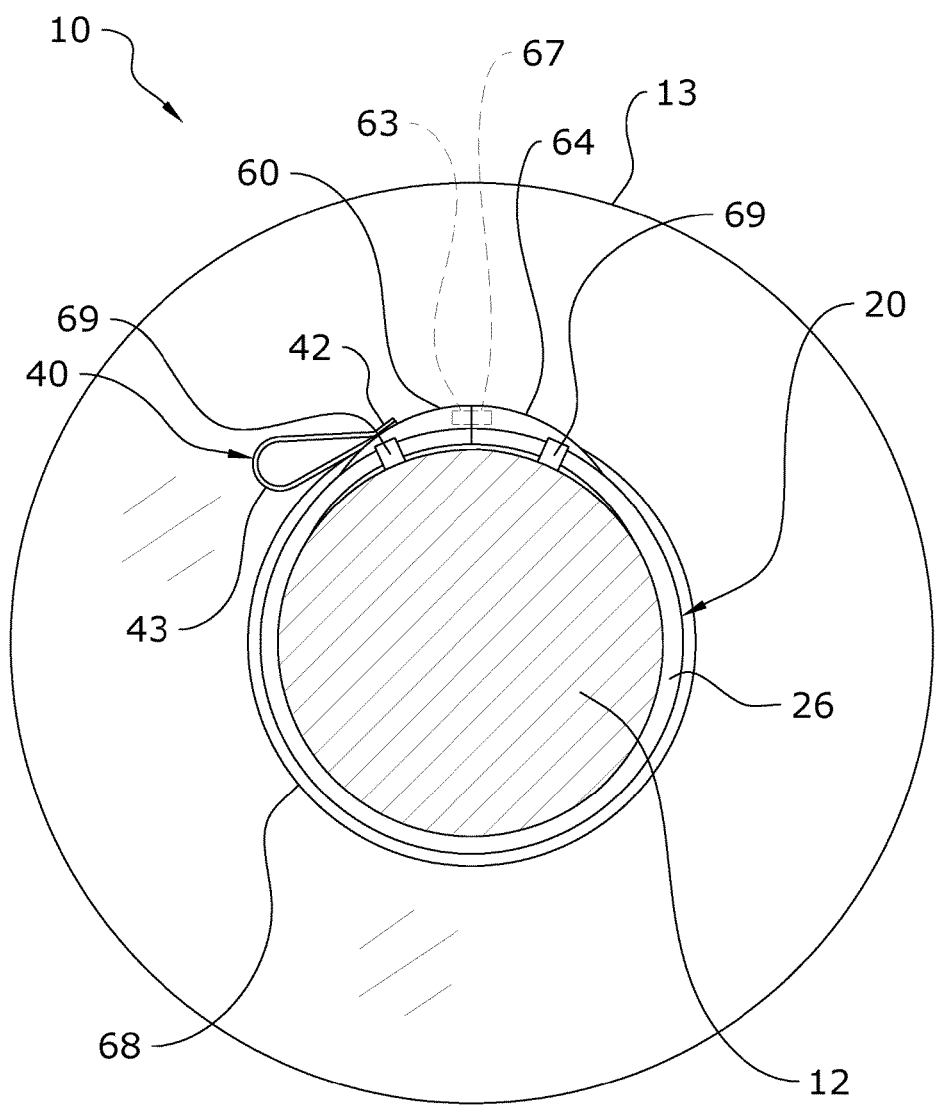
FIG. 29 is a side view of a barbell collar system in use in accordance with a fifth example embodiment.
Figure 30:
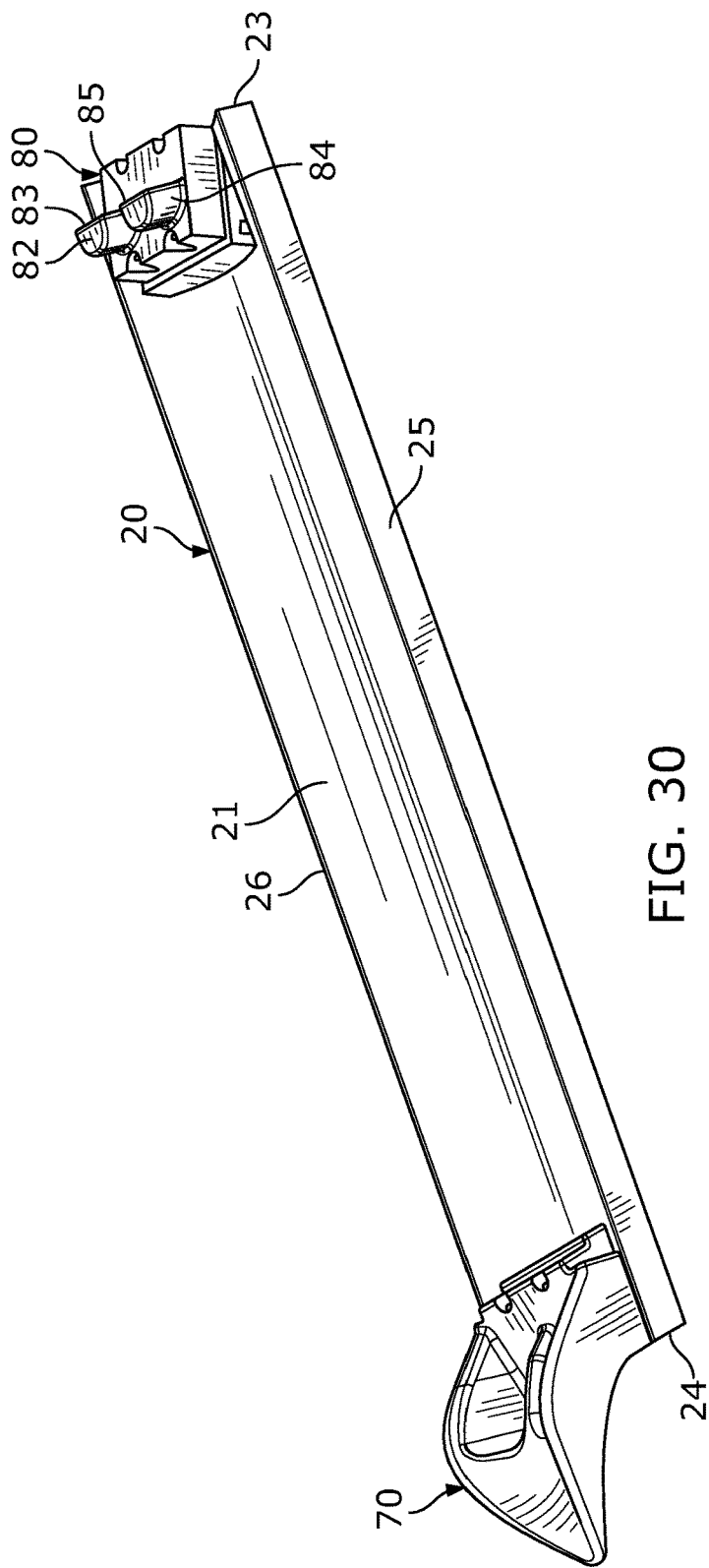
FIG. 30 is a perspective view of a barbell collar system in an open linear state in accordance with a sixth example embodiment.

The shape, size, length, width and configuration of the collar 20 may vary in different embodiments. In the exemplary figures, which are in no way limiting on the scope of the invention, the collar 20 is illustrated as comprising an elongated rectangular shape. As best shown in FIG. 1, the collar 20 thus includes a first end 23, a second end 24, a first side 25, and a second side 26. When in its first position wrapped around the barbell 12, the ends 23, 24 of the collar 20 may contact each other as shown in FIG. 29, may not contact each other as shown in FIG. 8, or may overlap as shown in FIG. 10.

The length of the collar 20 preferably is sufficient so that the opposing ends 23, 24 of the collar 20 are at least near one another, adjacent one another or overlapping one another. For example, a conventional barbell collar has a 2 inch diameter and a 6.28 inch circumference. The length of the collar 20 preferably is approximately 6 inches to 10 inches, however, greater or less lengths may be used in various different embodiments. The width of the collar 20 may also vary depending upon the amount of friction desired. While greater or less widths may be used, it is preferable that the width of the collar 20 is approximately 1-1.5 inches and further preferably approximately 1.25 inches.

The collar 20 includes an outer surface 21 which faces away from the barbell 12 when the collar 20 is in use. The collar 20 also includes an inner surface 22 which contacts and is secured against the barbell 12 when the collar 20 is in use. When the collar 20 is in its first position (i.e., curled to wrap around the barbell 12), the collar 20 will be curved inwardly toward its inner surface 22. In other words, the ends 23, 24 of the collar 20 will curve inwardly toward the inner surface 22 and toward each other to form the looped or curled configuration when the collar 20 is in use on a barbell 12.

The collar 20 is adapted to both snap between its different positions and to be retained against the barbell 12 with enough strength to prevent the force from any weights 13 retained on the barbell 12 from moving the collar 20 in any direction along the barbell 12. The collar 20 will thus preferably include a high friction material on at least its inner surface 22 which contacts the barbell 12 to aid in preventing slippage of the collar 20 with respect to the barbell 12.

An exemplary embodiment is shown in FIGS. 1-7 in which the collar 20 comprises a ribbon spring 32 which is covered by an outer covering 30. The ribbon spring 32 provides the "snap" between the two positions of the collar 20. The outer covering 30 creates the friction between the collar 20 and the barbell 12 to retain the collar 20 in position around the barbell 12.

The configuration and type of ribbon spring 32 utilized may vary in different embodiments. The ribbon spring 32 will generally comprise a ribbon or band which is easily snapped into a curled position by applying pressure on the inner surface of the ribbon spring 32. The ribbon spring 32 may be constructed of various types of suitable materials such as, but not limited to a metal, a bistable spring band or a layered, flexible stainless steel bistable spring band. U.S. Publication No. 2003/0155389 filed by Vincent Swartzentruber discloses a Slap on Watch disclosing a bistable spring metal suitable for use in the various embodiments of the present invention and is hereby incorporated by reference herein. U.S. Pat. No. 6,220,916 to Bart discloses a Toy Band with Pre-recorded Message that has a bistable spring suitable for use in the various embodiments of the present invention and is also hereby incorporated by reference herein.

The bistable spring band is preferably coated with rubber, silicone, elastomer or other non-slip material. The coating 30 on the inner surface 22 of the collar 20 may be different than the coating 30 on the outer surface 21, wherein the coating 30 on the inside of the collar 20 may have an increased friction coefficient to increase frictional engagement with the metal barbell 12 and the outer coating 30 may increase frictional engagement with the skin of an exerciser performing an exercise.

The ribbon spring 32 may be reverted into an elongated position (first state) by pulling outwardly on the ribbon spring 32 while in its curled position (second state), which will cause the ribbon spring 32 to snap back into the elongated position. Ribbon springs 32 are commonly referred to as "snap bands" or "slap bands" and are perhaps most commonly associated with tape measures. The shape and size of the ribbon spring 32 may vary in different embodiments and should not be limited by the exemplary figures.

The outer covering 30 either fully or partially covers the ribbon spring 32. The figures illustrate that the outer covering 30 covers the entirety of the ribbon spring 32 to form the collar 20, but it should be appreciated that, in some embodiments, the outer covering 30 may only cover the inner surface 22 (i.e., the surface of the collar 20 which contacts the barbell 12).

The outer covering 30 may comprise any material which will produce the requisite friction between the collar 20 and the barbell 12 to prevent the collar 20 from sliding or moving along the barbell 12, even under force of pressure from the weight 13 pressing against the collar 12. Though many different non-slip materials may be utilized, a preferred embodiment will utilize rubber for the outer covering 30. The outer covering 30 may also be comprised of elastomers, silicone (e.g. compression molded silicone), non-slip vinyl, thermoplastic elastomer (TPE), plastic or any other non-slip material which will increase friction between the collar 20 and the barbell 12.

C. Magnets

As shown throughout the figures and various embodiments of the present invention, one or more magnets 34 may be utilized to secure the collar 20 to the barbell 12. In some embodiments, the collar 20 may also be secured against itself by overlapping its ends 23, 24 in the curled configuration around the barbell 12, such as shown in FIG. 10. In other embodiments, the collar 20 will also be secured against the barbell 12, with the respective ends 23, 24 of the collar 20 neither touching nor overlapping. The magnets 34 may be connected to the ribbon spring 32 or to the outer covering 30 in some embodiments. The magnets 34 are preferably comprised of permanent magnets and further are preferably comprised of rare-earth magnets to produce a strong magnetic field.

The magnets 34 may be directly molded within the collar 20 such as using an elastomer or molded rubber. Alternatively, the magnets 34 may also be inserted into holes stamped into the bistable spring band and then riveted in with fasteners. As another alternative of securing the magnets 34 within the collar 20, a piece of plastic with a rubber band that goes around the magnets 34 may be used. The position of the magnets 34 on the collar 20 depends upon the amount of overlapping of the collar 20 (if any overlap) upon itself.

In the preferred embodiment shown in FIGS. 1-7, the magnets 34 are positioned on the inner surface 22 of the collar 20 to secure the inner surface 22 of the collar 20 against the barbell 12. The magnets 34 may extend from the ribbon spring 32, thus creating protrusions 36 in the outer covering 30 as shown in the figures. This configuration, in which the magnets 34 are also covered by the outer covering 30, will aid in retaining the collar 20 against the barbell 12 by adding the frictional force of the outer covering 30 to the magnetic force of the magnets 34.

The type, size, positioning, orientation, and number of magnets 34 may vary in different embodiments. In some embodiments, one or both of the ribbon spring 32 and the outer covering 34 may comprise a magnetic material, thus negating the need for discrete magnets 34. In other embodiments, numerous magnets 34 may be secured against the collar 20 along its inner surface 22, such as shown in FIGS. 1-7, to ensure a tight, magnetic connection between the collar 20 and the barbell 12.

Figure 2:
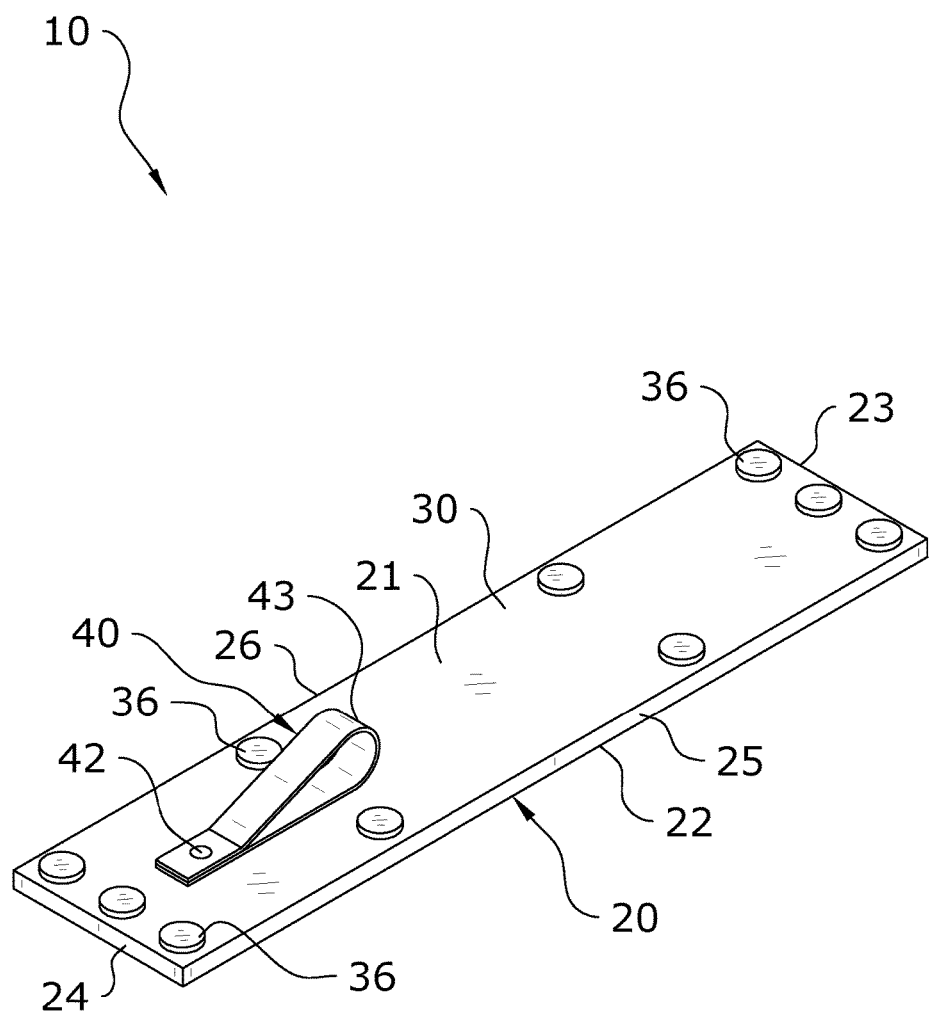
FIG. 2 is a second upper perspective view of a barbell collar system in accordance with a first example embodiment.
Figure 3:
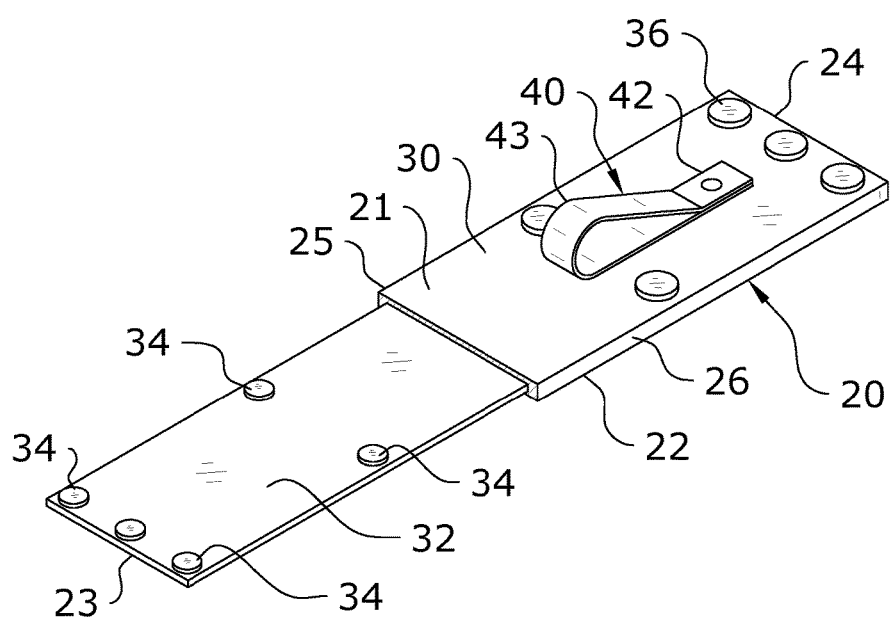
FIG. 3 is a partial cutaway view of a barbell collar system in accordance with a first example embodiment.
Figure 4:
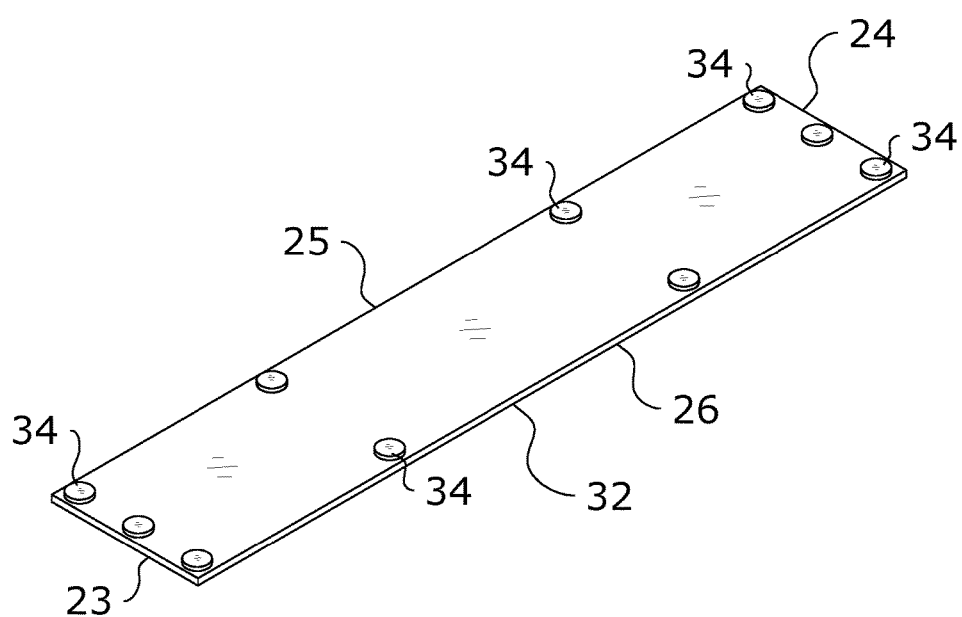
FIG. 4 is a bottom perspective view of a barbell collar system in accordance with a first example embodiment.
Figure 5:
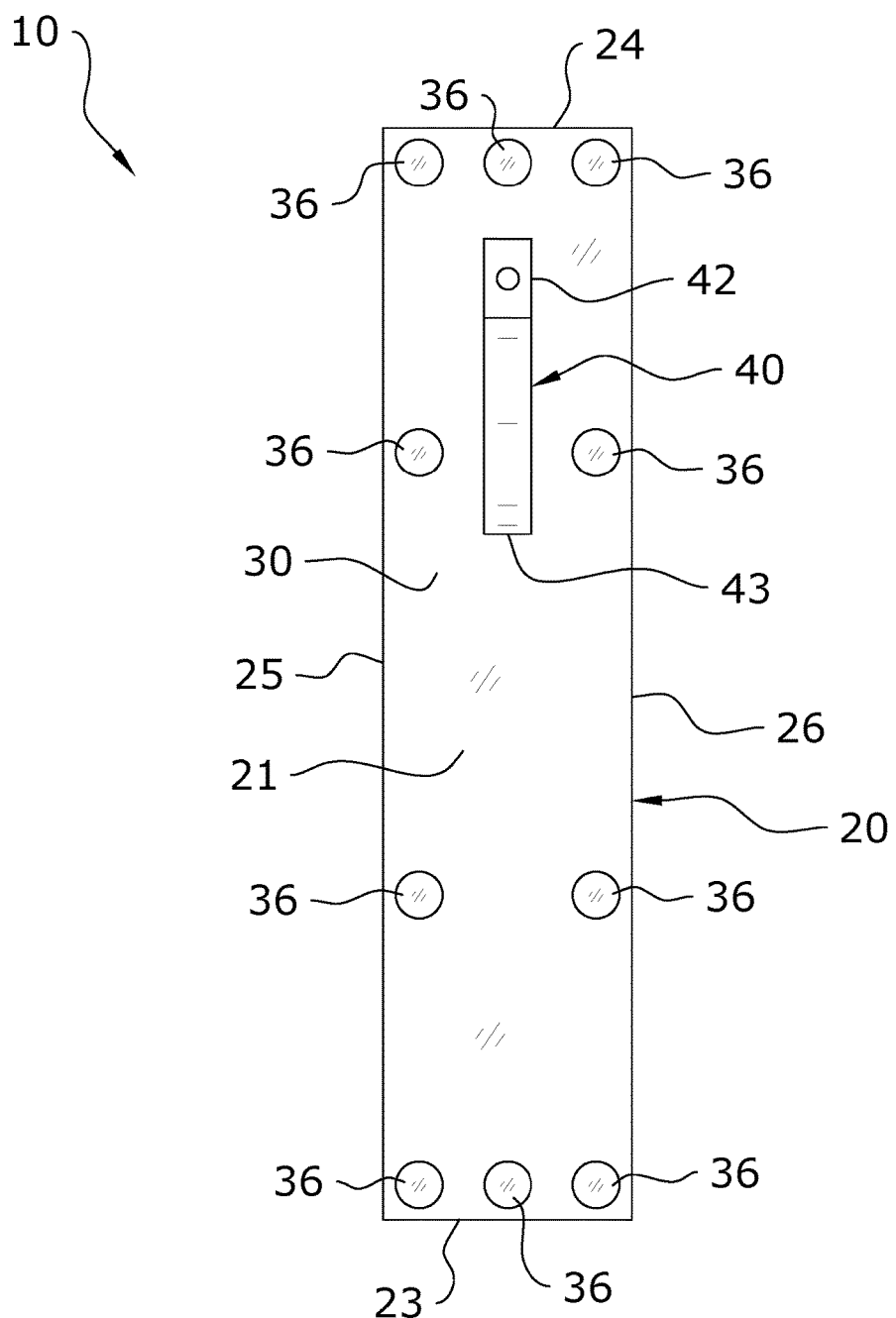
FIG. 5 is an outer view of a barbell collar system in accordance with a first example embodiment.
Figure 6:
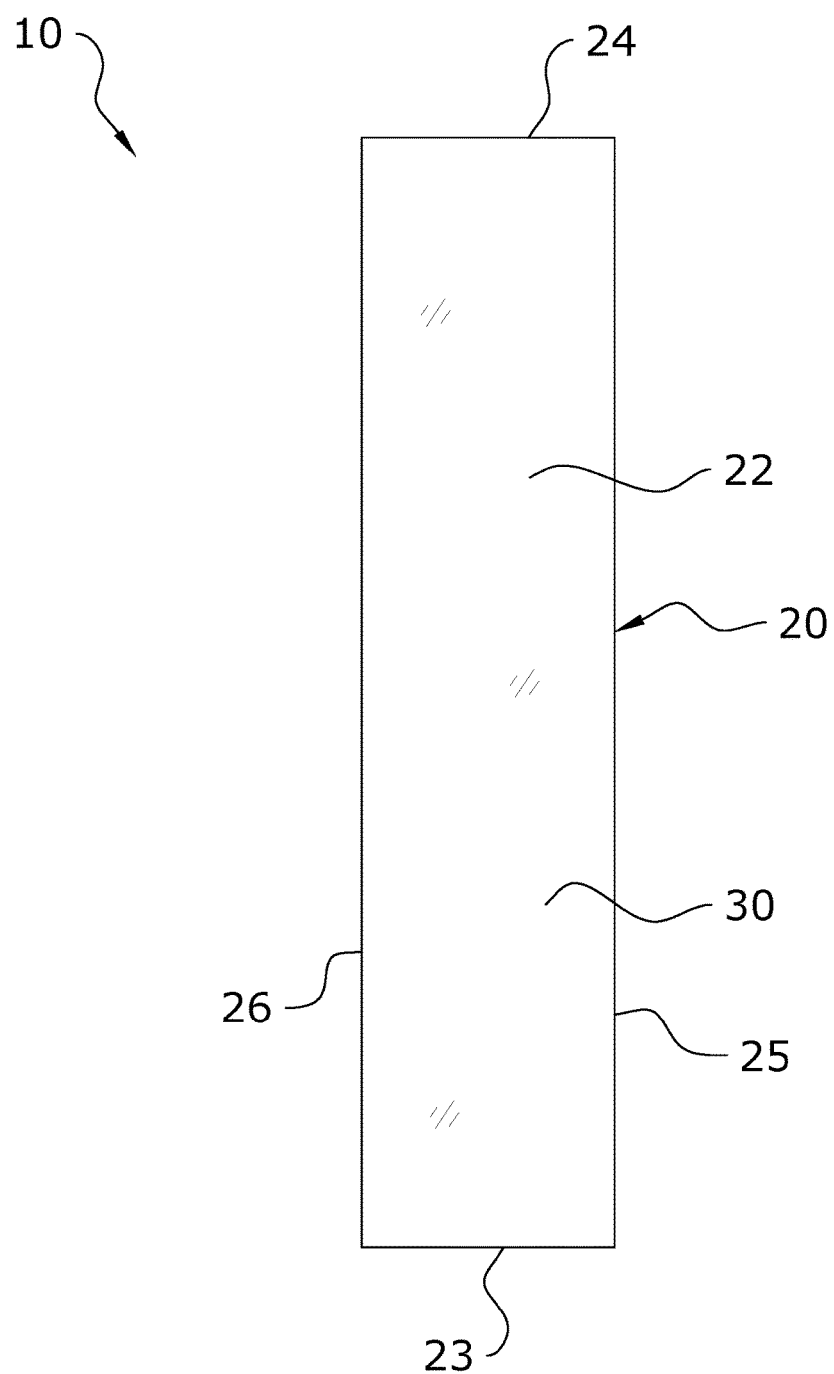
FIG. 6 is an inner view of a barbell collar system in accordance with a first example embodiment.

In the embodiment shown in FIGS. 1-11, a plurality of magnets 34 are positioned on the collar 20 so as to magnetically attract the collar 20, and more specifically the inner surface 22 of the collar 20, to the barbell 12. In such an example embodiment, which is not in any way limiting on the scope of the present invention, it is shown that a plurality of magnets 34 are positioned near either end 23, 24 of the collar 20. Additional magnets 34 are also positioned between the ends 23, 24 of the collar 20 as best shown in FIG. 4.

Such a configuration allows for the collar 20 to be firmly and securely engaged with the barbell 12 when the collar 20 is in its curled position. More or less magnets 34 may be utilized in different embodiments. Magnets 34 may be oriented in varying manners, such as in rows or in a grid pattern in different embodiments.

Figure 12:
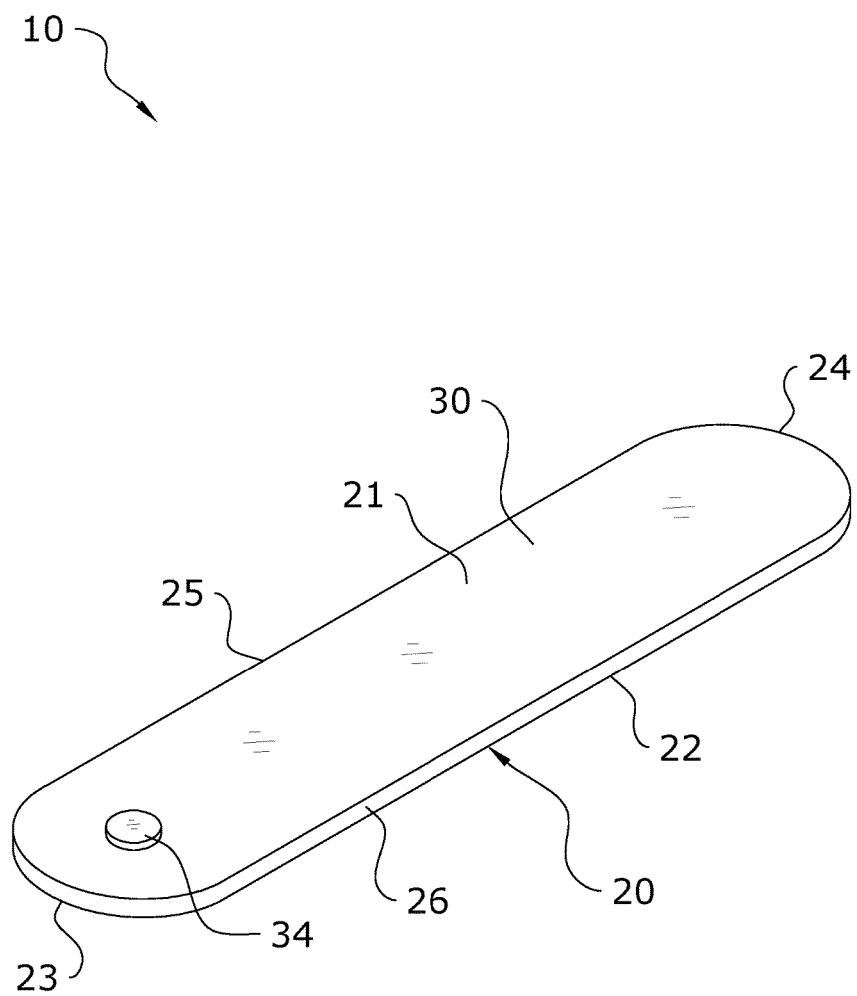
FIG. 12 is an upper perspective view of a barbell collar system in accordance with a second example embodiment.
Figure 13:
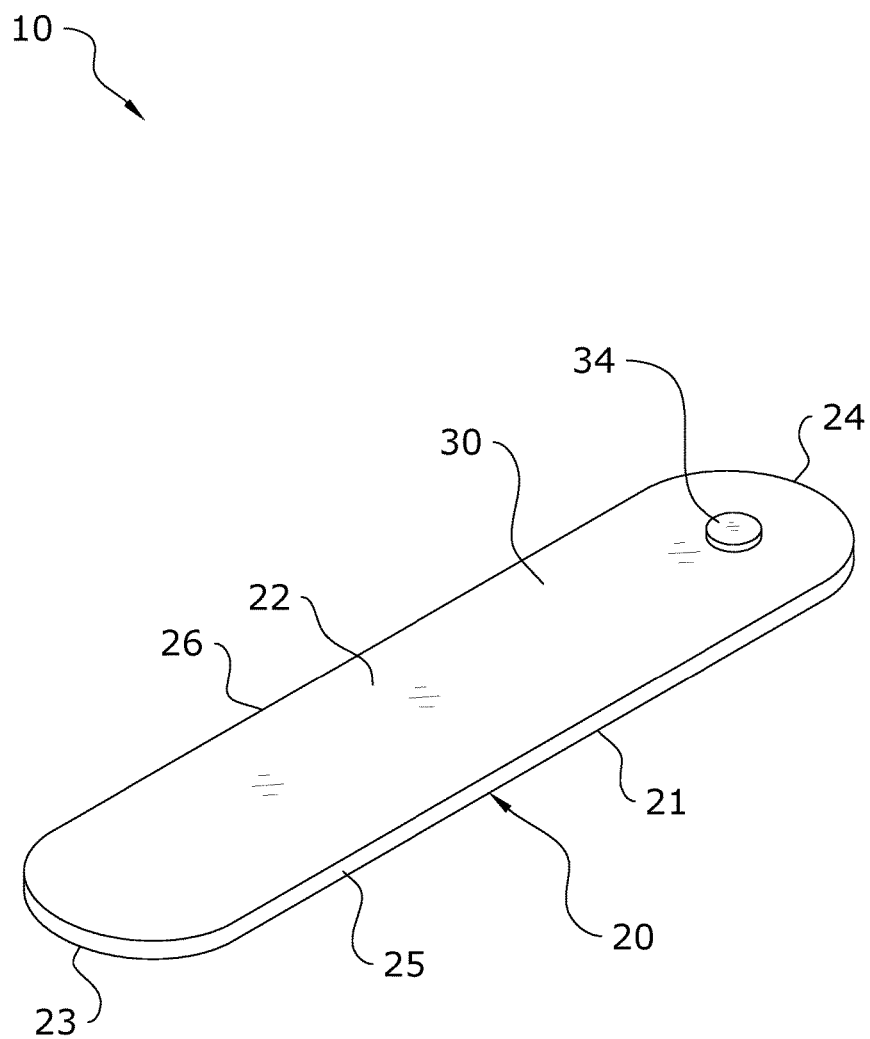
FIG. 13 is a lower perspective view of a barbell collar system in accordance with a second example embodiment.
Figure 14:
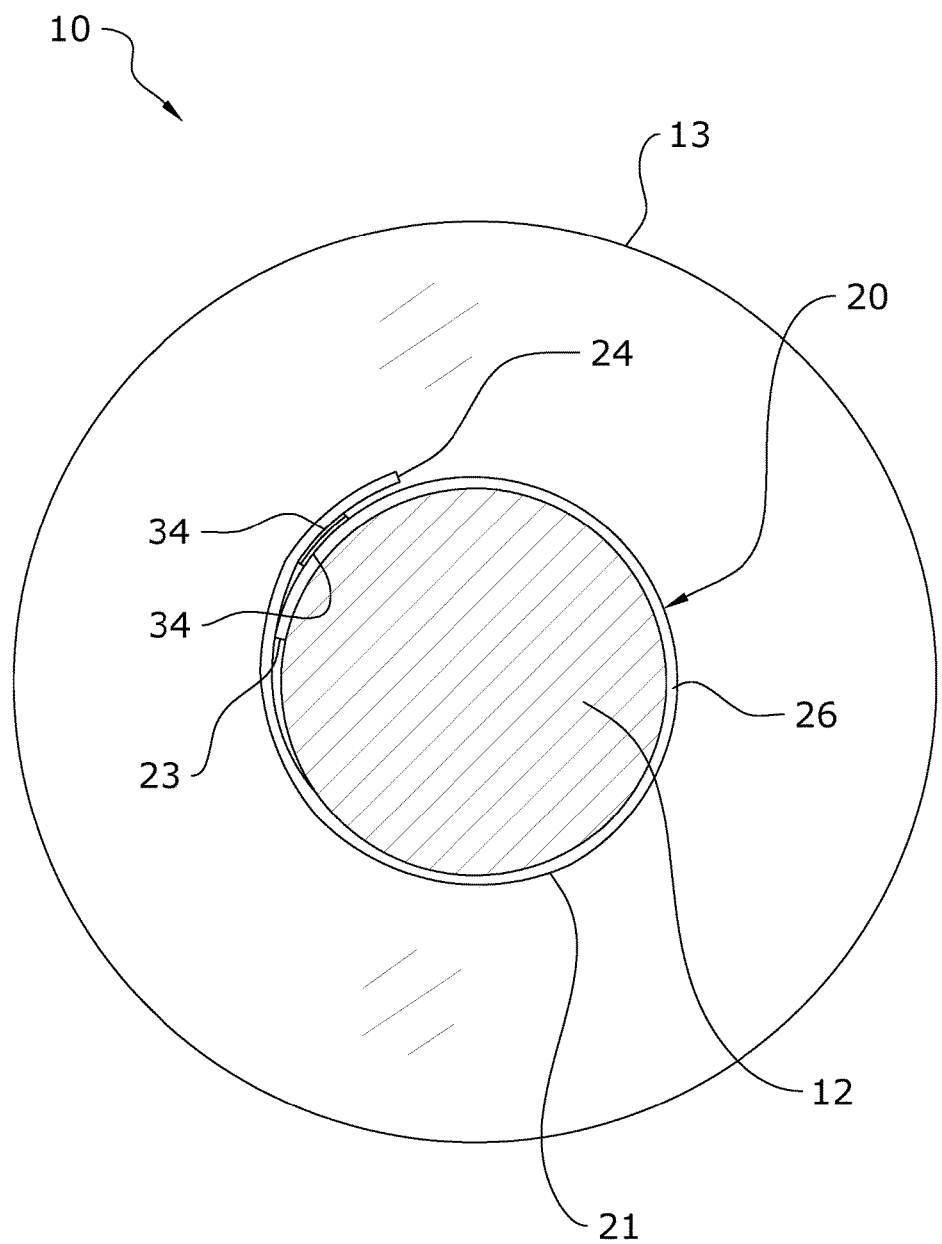
FIG. 14 is a side view of a barbell collar system in use in accordance with a second example embodiment.

In the embodiment shown in FIGS. 12-14, the collar 20 may include a first magnet 34 positioned near the first end 23 of the collar 20 and a second magnet 34 positioned near the second end 24 of the collar 20. The first magnet 34 may be adapted to magnetically engage with the second magnet 34 to removably connect the first end 23 of the collar 20 to the second end 24 of the collar 20 when the collar 20 is in the first position.

As shown in FIGS. 12 and 13, a first magnet 34 may be positioned near the first end 23 of the collar 20 on its outer surface 21 and a second magnet 34 may be positioned near the second end 24 of the collar 20 on its inner surface 22. More than one magnet may be attached to the inner and outer surfaces of the collar 20 to achieve an increased magnetic connection. As shown in FIG. 14, the magnets 34 are aligned with one another and engage with each other when the collar 20 is wrapped around the barbell 12 in such an embodiment. This ensures a tight fit of the barbell 12 around the collar 20.

D. Handle

In some embodiments, a handle 40 may be provided to aid in removing the collar 20 from around a barbell 12 or for carrying the collar 20 when in its elongated position. The handle 40 may comprise various configurations which allow an operator to grasp the handle 40 and thus pull the collar 20 outwardly or carry the collar 20.

The handle 40 may be positioned at various locations along the collar 20, and thus should not be construed as limited to being positioned on the outer surface 21 near the second end 24 as shown in the exemplary figures. In some embodiments, the handle 40 may extend from either end 23, 24 of the collar 20. In other embodiments, the handle 40 may be omitted entirely.

In the embodiment shown in FIGS. 1-3, the handle 40 comprises an anchored portion 42 and a looped portion 43 extending from the anchored portion 42. The anchored portion 42 is connected to the collar 20, such as to the outer surface 21 as shown in the figures. The looped portion 43 is adapted to be grasped and pulled by the operator, which will extend force on the anchored portion 42 that is transferred to the collar 20 to pull the collar 20 outwardly. By using the handle 40, the collar 20 can be more easily transitioned from its curled position to its elongated position.

E. Alternate Embodiments

FIGS. 15-20 illustrate an alternate embodiment in which connectors 50, 52 are utilized to secure the collar 20 to itself in a curled position when installed on a barbell 12. In such an embodiment, magnets 34 may be omitted entirely; with the connectors 50, 52 providing the same function as magnets 34 would have provided in other embodiments.

Figure 15:
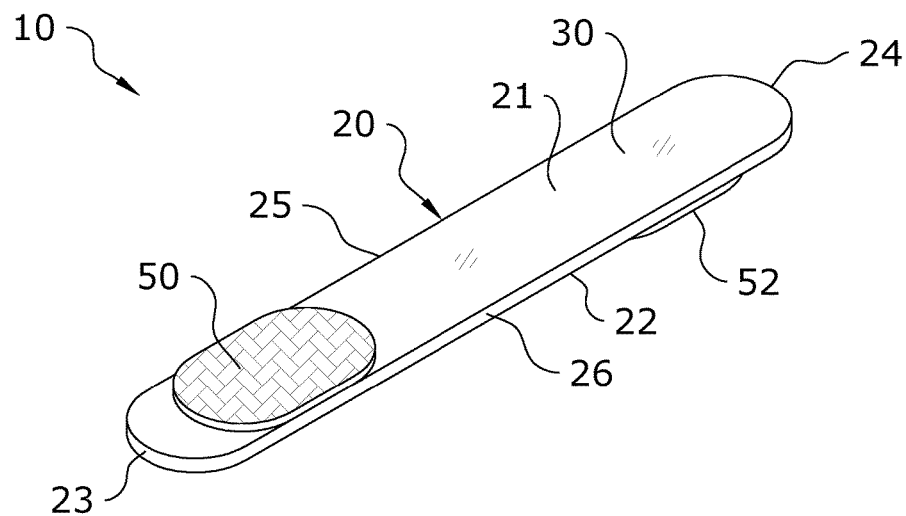
FIG. 15 is an upper perspective view of a barbell collar system in accordance with a third example embodiment.
Figure 16:
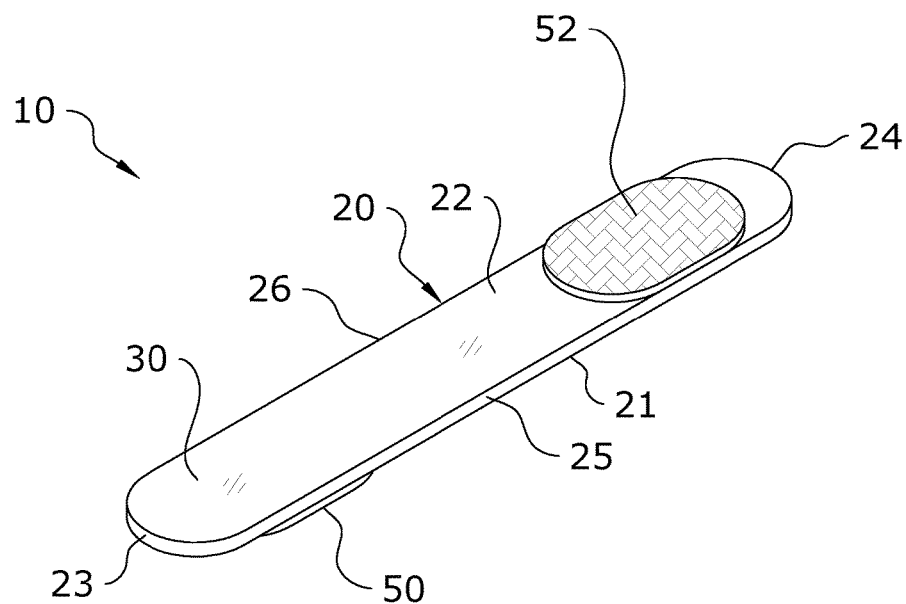
FIG. 16 is a lower perspective view of a barbell collar system in accordance with a third example embodiment.
Figure 17:
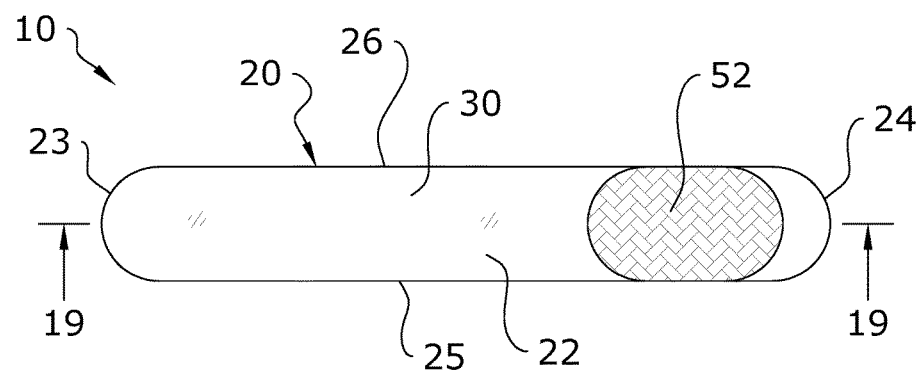
FIG. 17 is a top view of a barbell collar system in accordance with a third example embodiment.
Figure 18:
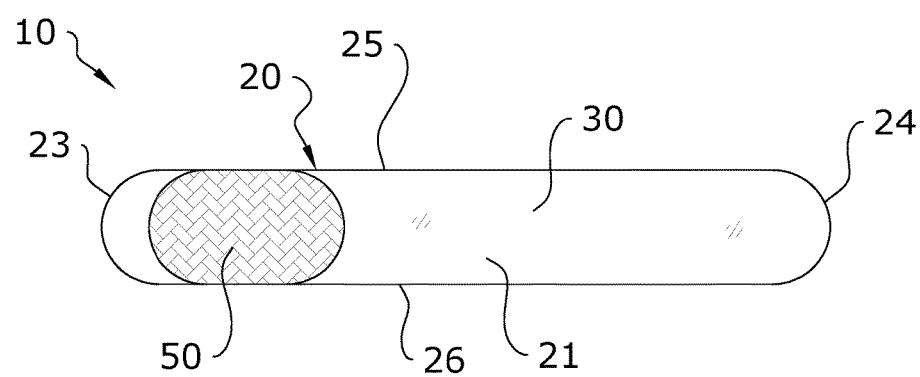
FIG. 18 is a bottom view of a barbell collar system in accordance with a third example embodiment.
Figure 19:
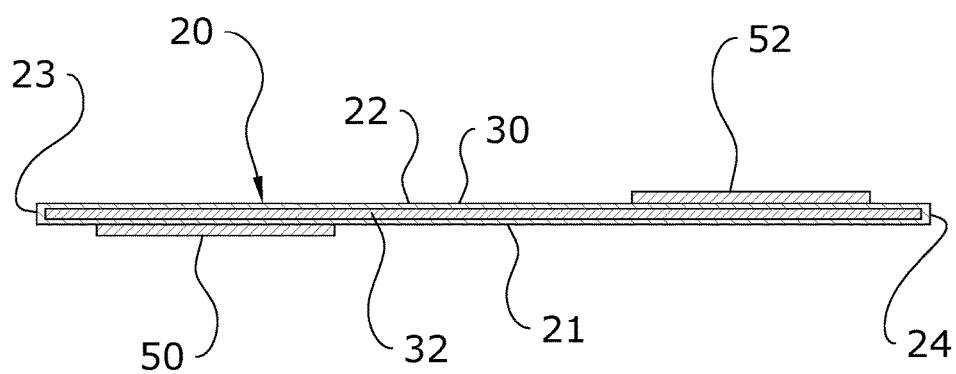
FIG. 19 is a side sectional view taken along line 19-19 of FIG. 17.
Figure 20:
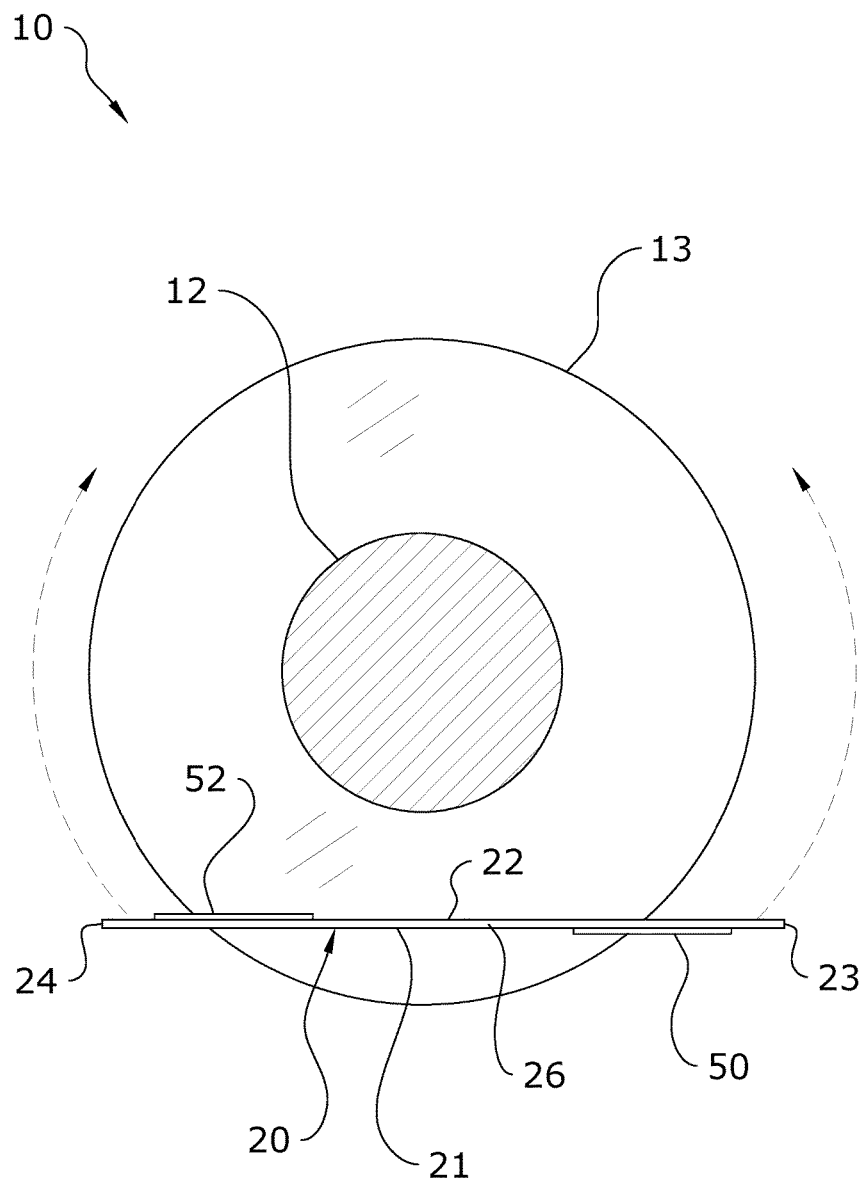
FIG. 20 is a side view of a barbell collar system being installed in accordance with a third example embodiment.

As best shown in FIGS. 15 and 16, this alternate embodiment may include a first connector 50 on the outer surface 21 of the collar 20 and a second connector 52 on the inner surface 22 of the collar 20. The first connector 50 is adapted to removably engage with the second connector 52 as shown in FIG. 20. Various types of connectors 50, 52 may be utilized, such as hook-and-loop fasteners that are adapted to provide the secure, but removable engagement necessary to hold the collar 20 in place around the barbell 12.

Figure 21:
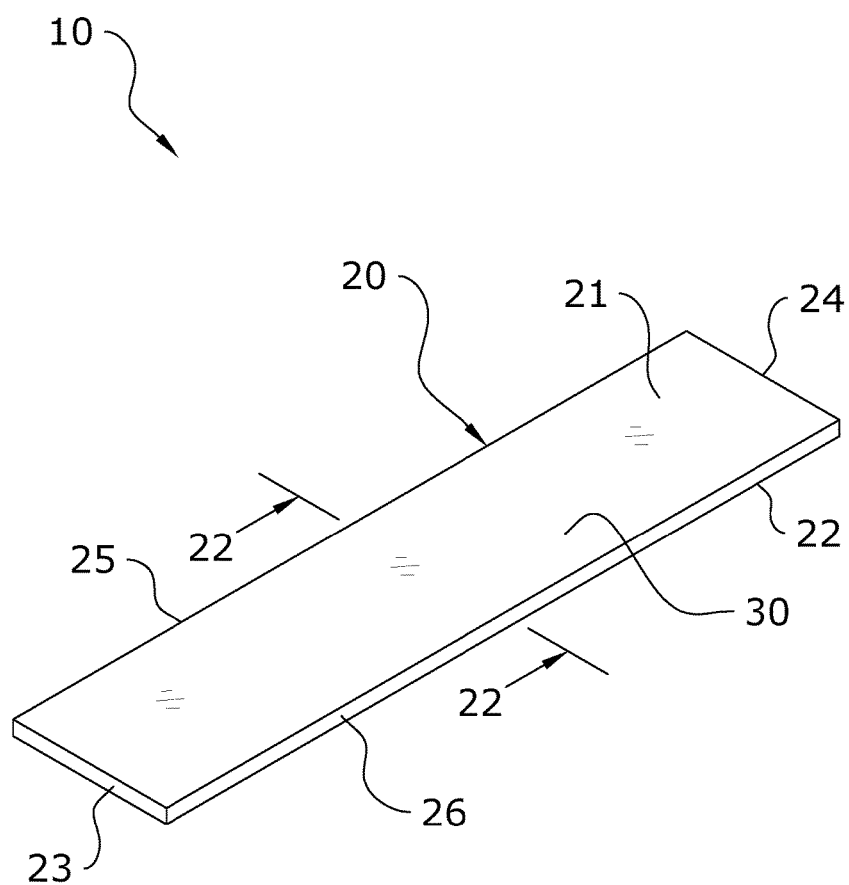
FIG. 21 is an upper perspective view of a barbell collar system in accordance with a fourth example embodiment.
Figure 22:
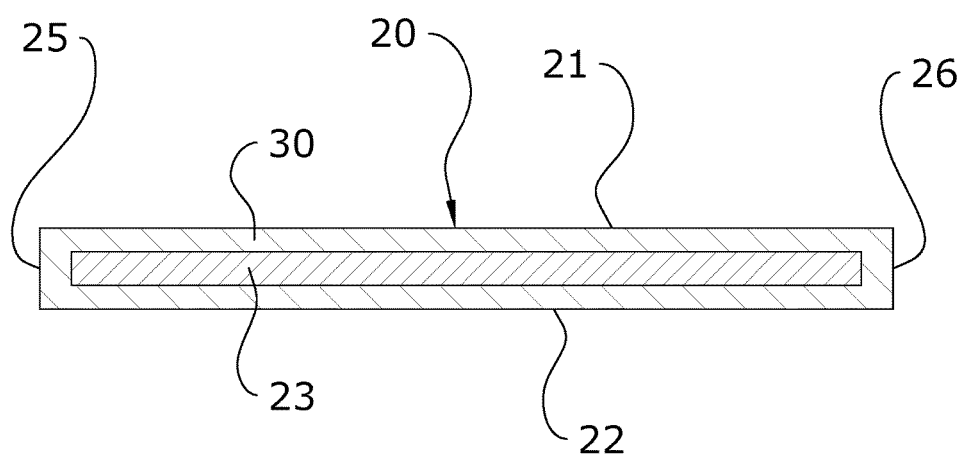
FIG. 22 is a side sectional view of a barbell collar system in accordance with a fourth example embodiment.
Figure 23:
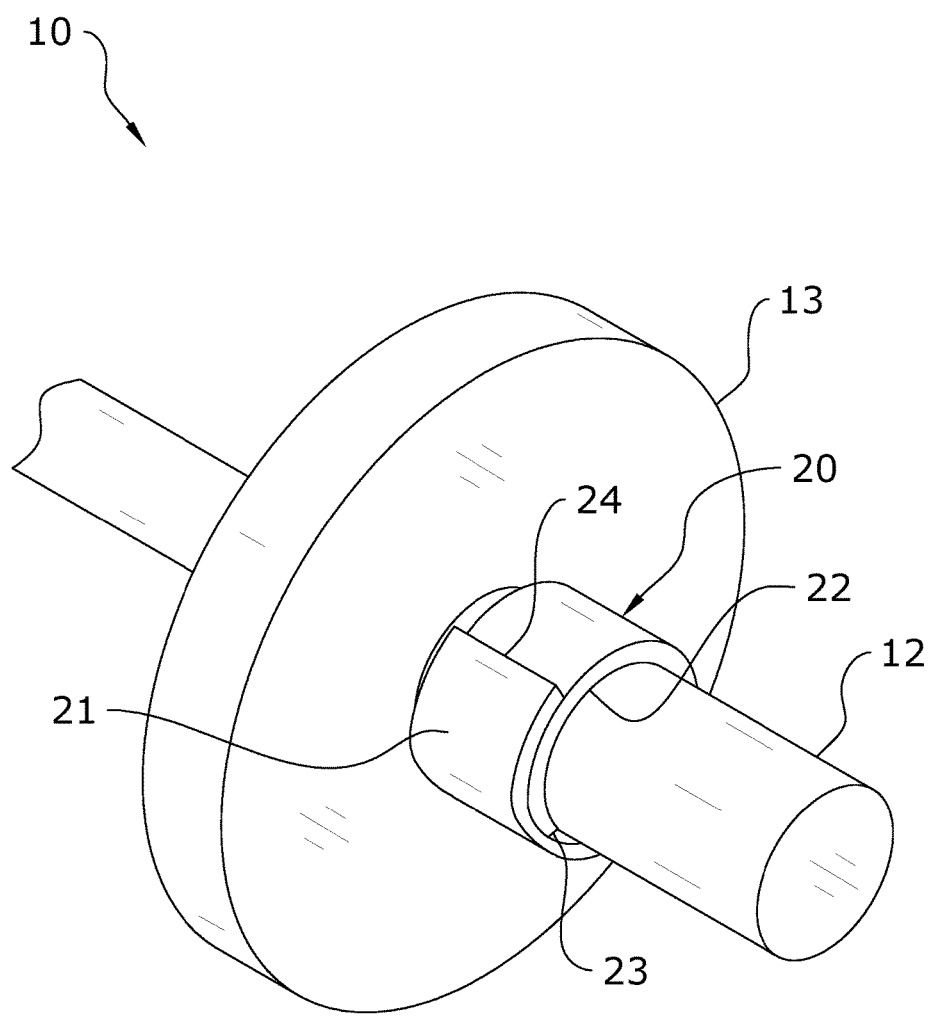
FIG. 23 is an upper perspective view of a barbell collar system in use in accordance with a fourth example embodiment.

FIGS. 21-23 illustrate an alternate embodiment in which neither connectors 50, 52 nor magnets 34 are utilized. Such an embodiment may not include any magnetic elements at all, but instead rely on the ribbon spring 32 to provide the force necessary to hold the collar 20 in its curled position on the barbell 12 to retain a weight 13 thereon. Alternatively, such an embodiment could utilize an outer covering 30 and/or ribbon spring 32 which itself is magnetic to provide the magnetic attraction.

FIGS. 24-29 illustrate yet another alternate embodiment which utilizes magnets 63, 67 which are positioned at the respective ends of the collar 20 such that first magnets 63 on a first end 23 of the collar 20 engage with second magnets 67 on the second end 24 of the collar 20. In this embodiment, the collar 20 includes a first housing 60 positioned at the first end 23 of the collar 20 and a second housing 64 positioned at the second end 24 of the collar 20. In some embodiments, housings 60, 64 may be omitted, with the first magnets 63 being positioned within the first end 23 of the collar 20 and the second magnets 67 being positioned within the second end 24 of the collar 20.

Figure 26:
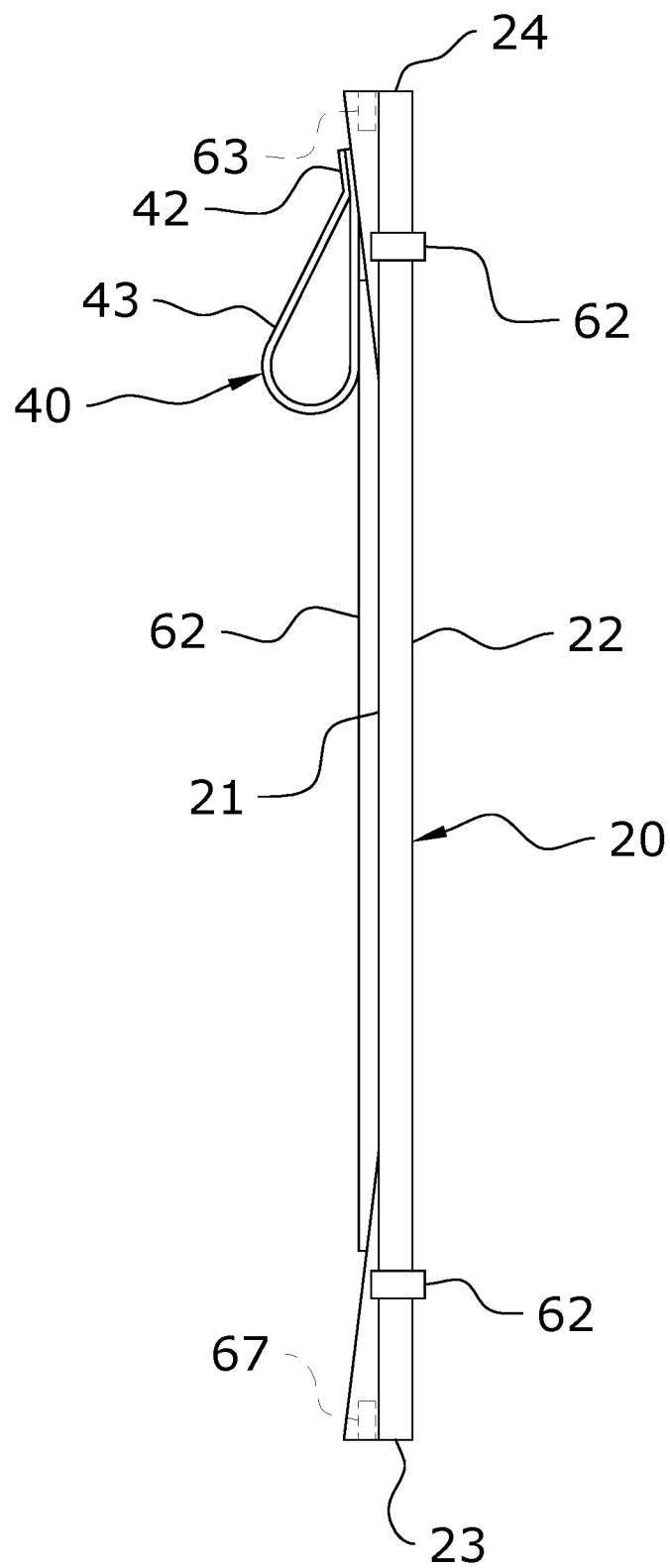
FIG. 26 is a side view of a barbell collar system in accordance with a fifth example embodiment.

The first housing 60 and second housing 64 may be wedge-shaped as shown in FIG. 26; with the first housing 60 having a first outer end 61 which tapers inwardly toward its first inner end 62 and the second housing 64 having a second outer end 65 which tapers inwardly toward its second inner end 66. The first outer end 61 of the first housing 60 will preferably be flush with the first end 23 of the collar 20. Similarly, the second outer end 65 of the second housing 64 will preferably be flush with the second end 24 of the collar 20.

Figure 27:
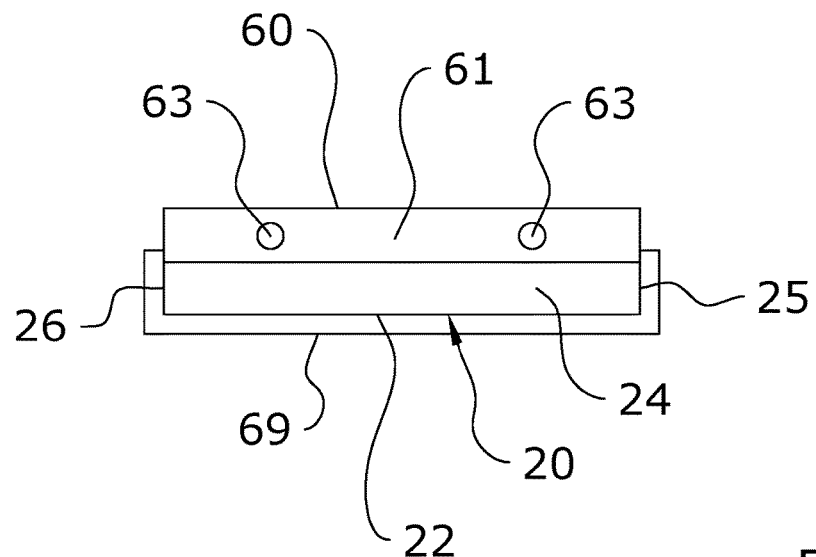
FIG. 27 is a front end view of a barbell collar system in accordance with a fifth example embodiment.
Figure 28:
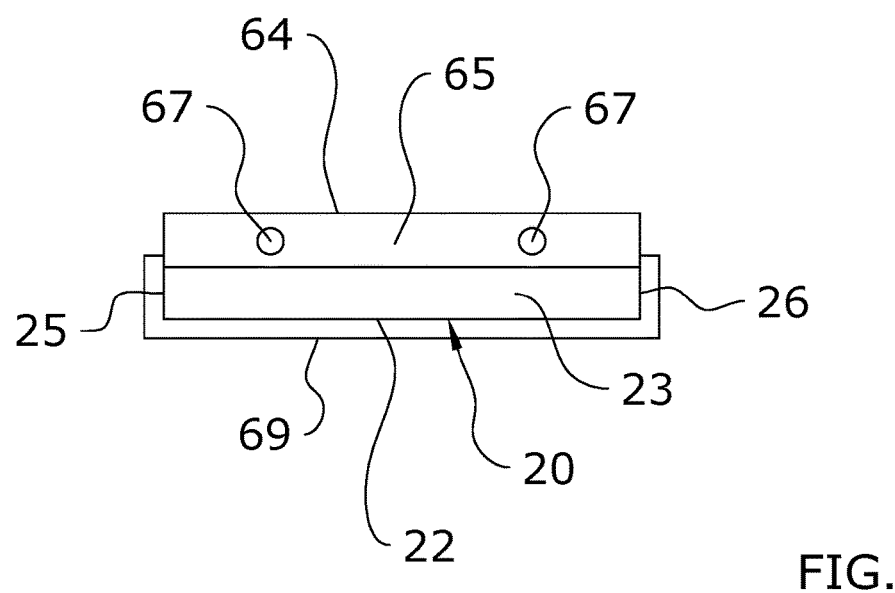
FIG. 28 is a rear end view of a barbell collar system in accordance with a fifth example embodiment.

As best shown in FIGS. 27 and 28, a first magnet 63 is positioned within the first housing 60 at the first end 23 of the collar 20 and a second magnet 67 is positioned within the second housing 64 at the second end 24 of the collar 20. The collar 20 is adjustable between a first position in which the first end 23 and the second end 24 of the collar are each curled inwardly to secure the collar 20 around the barbell 12 and a second position in which the collar 20 is elongated in a linear orientation; with the first magnet 63 engaging with the second magnet 67 when the collar 20 is in the first position.

In some embodiments, the first and second housings 60, 64 may be integrally formed of a unitary structure with the collar 20. In other embodiments, the first and second housings 60, 64 may be connected to the collar 20. As best shown in FIG. 16, such embodiments may include a first housing connector 69 adapted to connect the first housing 60 to the collar 20 and a second housing connector 69 adapted to connect the second housing 64 to the collar 20.

The first housing connector 69 may be comprised of a first band extending around the first housing 60 and the collar 20. The second housing connector 69 may be comprised of a second band extending around the second housing 64 and the collar 20. Such an exemplary embodiment should not be construed as limiting, however, as any number of methods may be utilized for securing the first housing 60 and the second housing 64 to the respective ends 23, 24 of the collar 20.

Figure 24:
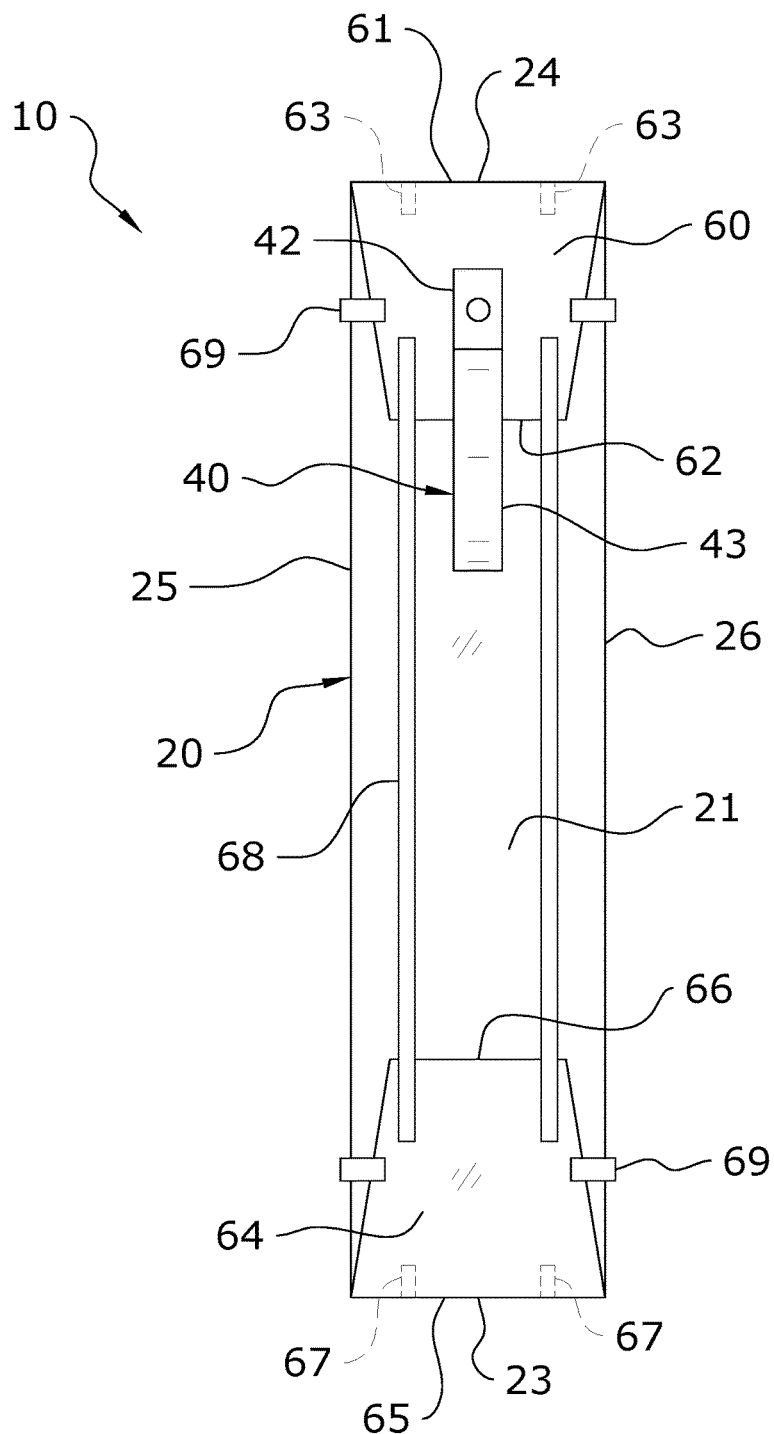
FIG. 24 is an outer view of a barbell collar system in accordance with a fifth example embodiment.
Figure 25:
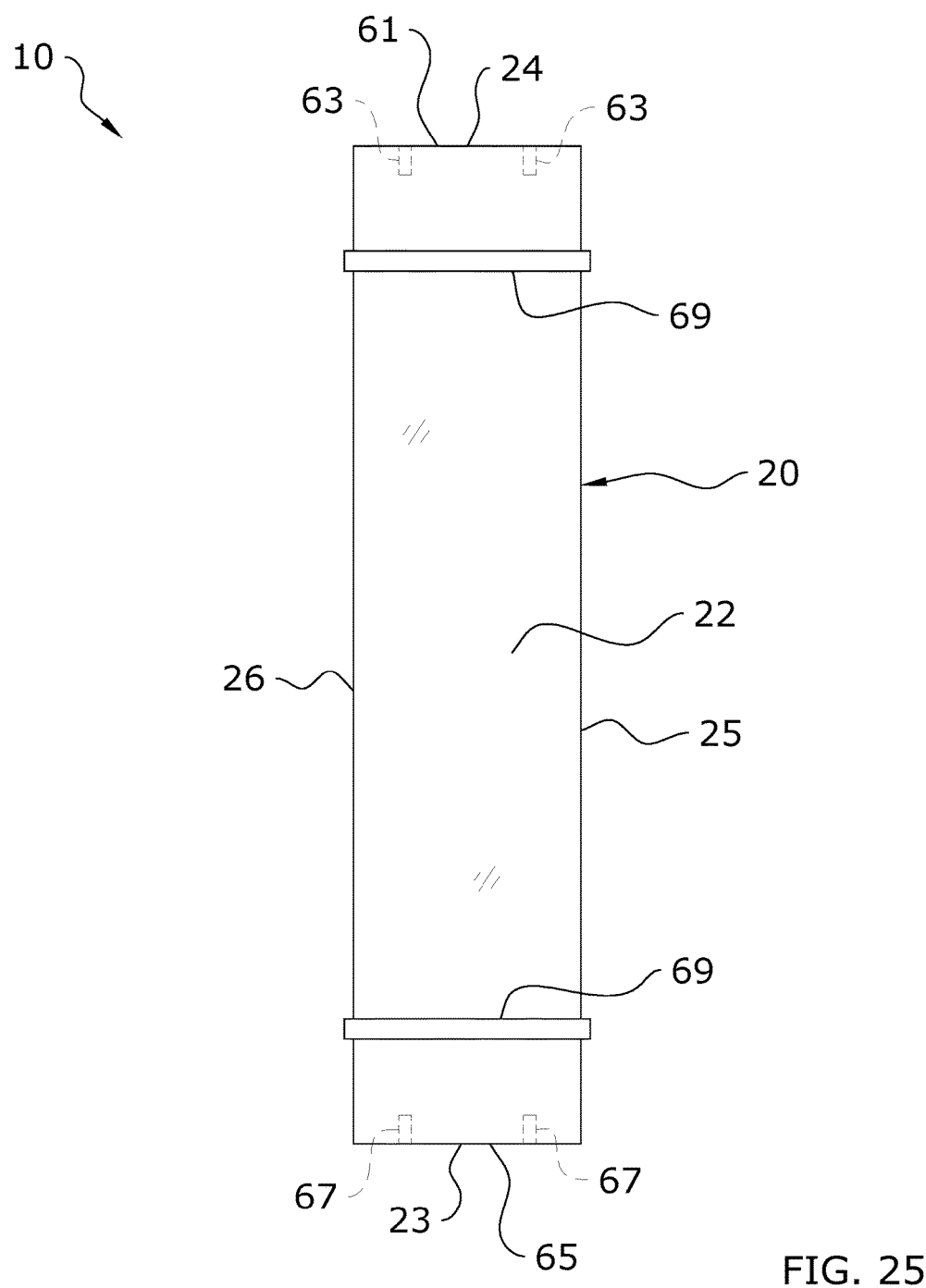
FIG. 25 is an inner view of a barbell collar system in accordance with a fifth example embodiment.

As best shown in FIG. 24, the collar 20 may include a tension connector 68 which extends between the first housing 60 and the second housing 64. The tension connector 68 may comprise any elongated member, preferably under tension, which connects the two housings 60, 64. The tension connector 68 may comprise a tensioned cable in some embodiments.

F. Operation of Embodiments

In use, the weight 13 is first positioned on the barbell 12. Generally, a number of weights 13 may be stacked onto the barbell 12. The weights 13 are generally pushed inwardly on the barbell 12 until they reach a stopper. At this point, the collar 20 may be installed to secure the weights 13 on the barbell 12. The collar 20 is generally installed on the outer end of the weights 13 to secure the weights 13 against the stopper of the barbell 12.

Figure 7:
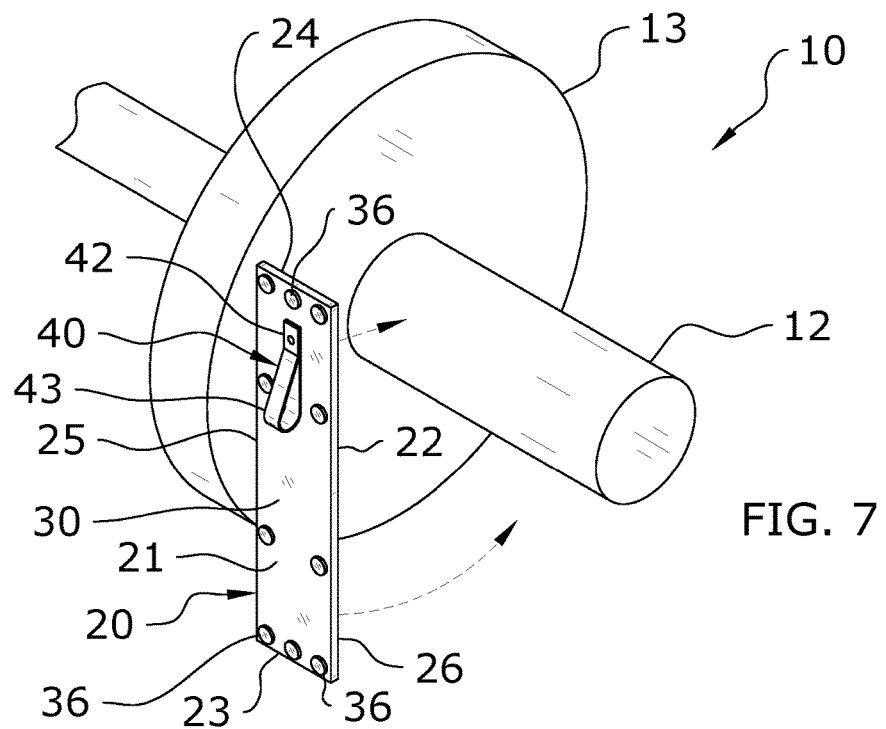
FIG. 7 is an upper perspective view of a barbell collar system being aligned for installation on a barbell in accordance with a first example embodiment.
Figure 9:
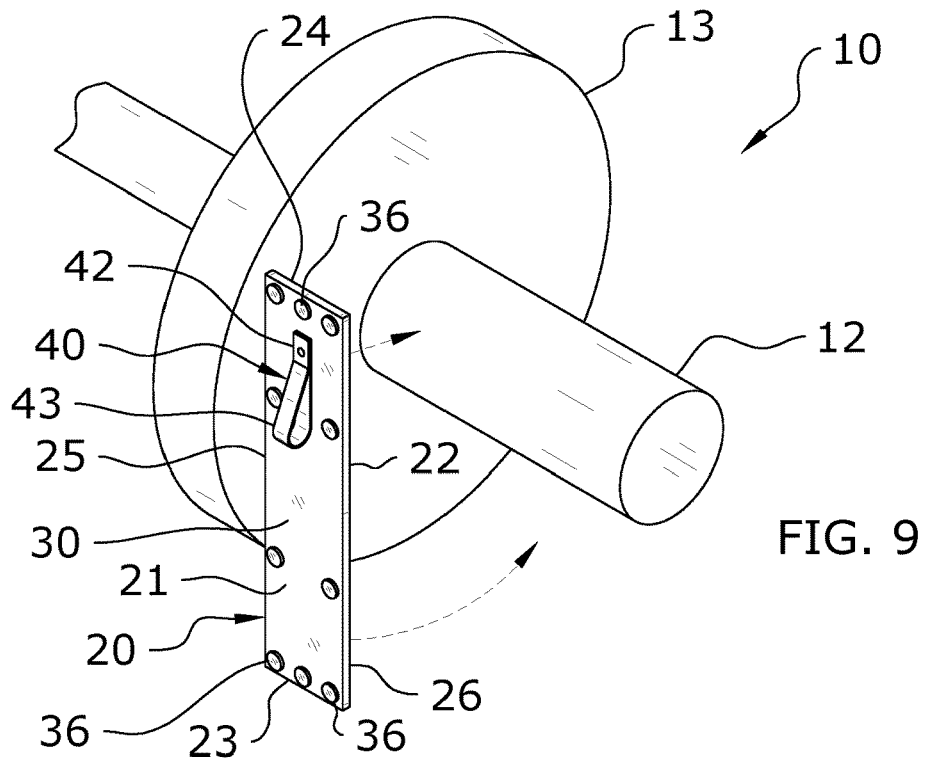
FIG. 9 is an upper perspective view of a barbell collar system aligned for installation on a barbell such that the collar connects to itself in accordance with a first example embodiment.

The process for installation of the collar 20 onto the barbell 12 is largely similar among the different embodiments discussed herein. First, the collar 20 will begin in its elongated, linear state prior to installation on the barbell 12. If the collar 20 has been stored in its curled state, the collar 20 can be elongated by pulling outwardly on its ends 23, 24 until it snaps into the elongated, linear position. FIGS. 7 and 9 illustrate the collar 20 in an elongated state prior to being installed around a barbell 12 with the weight 13 already in position on the barbell 12.

To install the collar 20 onto the barbell 12, the collar 20 may be grasped at either of its ends 23, 24 by the operator. The collar 20 may then be slapped or otherwise forced against the barbell 12 at any location along the inner surface 22 of the collar 20. Pressure on the inner surface 22 of the collar 20 will cause the ends 23, 24 of the collar 20 to naturally curve inwardly to adjust the collar 20 into its curled position. The operator may release the grasped end 23, 24 of the collar 20 allow the collar 20 to fully encircle the barbell 12 outside of the weight 13.

It should be appreciated that the collar 20 is adapted to be biased toward a curled position in which both of its ends 23, 24 curl inwardly towards each other so that the collar 20 forms a looped configuration to wrap around the barbell 12. The collar 20 will naturally remain in its elongated, linear position absent any force, but the application of force on the inner surface 22 of the collar 20 will result in both ends 23, 24 of the collar 20 curving inwardly to adjust the collar 20 into its curled position.

The collar 20 will be retained on the barbell 12 by both the magnetic attraction of the magnets 34 and the frictional engagement of the outer covering 30. Preferably, the collar 20 will "snap" into its curled position around the barbell 12, with the magnets 34 engaging the collar 20 with the barbell 12 as shown in FIG. 8 and, in some embodiments such as shown in FIG. 10, additionally engaging the first end 23 with the second end 24 of the collar 20.

FIGS. 7-8 illustrate installation of a collar 20 which does not overlap with itself. In this embodiment, the magnets 34 directly secure the collar 20 onto the barbell 12. FIGS. 9-10 illustrate installation of a collar 20 which does overlap with itself. In this embodiment, the magnets 34 both secure the collar 20 onto the barbell 12 in addition to securing the ends 23, 24 of the collar 20 together in the curled position.

When it is desired to remove weights 13 from the barbell 12, the collar 20 may be easily removed from the barbell 12 so that the weights 13 can be slid off the end of the barbell 12. To remove the collar 20 from the barbell 12, the operator first exerts outward pressure on the collar 20, such as by grasping one of its ends 23, 24 and pulling outwardly.

This outward pressure on the collar 20 snaps the collar 20 back into its elongated, linear position. In embodiments which include a handle 40, the handle 40 may be grasped and pulled outwardly for the same effect. The collar 20 may be hung up on a rack, such as by magnetic attraction or by the handle 40. The collar 20 may also be transported by grasping the handle 40 and carrying the collar 20.

FIGS. 12-14 illustrate an embodiment in which the magnets 34 do not directly engage with the barbell 12 itself. In such an embodiment, the first magnet 34 on the outer surface 21 of the collar 20 near its first end 23 will engage with the second magnet 34 on the inner surface 22 of the collar 20 near its second end 24 when the collar 20 is wrapped around the barbell 12 as shown in FIG. 14.

The steps for installation and removal of the collar 20 remain the same, with the collar 20 preferably snapping between its two positions. To install the embodiment shown in FIGS. 12-14, the collar 20 begins in its elongated, linear position as shown in FIGS. 12 and 13. The collar 20 is grasped at either end 23, 24 and slapped or otherwise forced against the barbell 12 at any location along its inner surface 22.

The force of pressure on any point on the inner surface 22 of the collar 20 will cause the ends 23, 24 of the collar 20 to curl inwardly such that the collar 20 wraps around the barbell 12. The magnets 34 at the respective ends 23, 24 of the collar 20 may naturally engage with each other to lock the collar 20 in place around the barbell 12. If they do not naturally engage, the operator may manually grasp one or both ends 23, 24 and adjust them to engage the magnet 34 on the first end 23 with the magnet 34 on the second end 24 such as shown in FIG. 14.

To release the embodiment of FIGS. 12-14, the second end 24 of the collar 20 may be grasped and pulled outwardly such that the magnets 34 on the respective ends 23, 24 of the collar 20 disengage from each other. Continuing to pull the collar 20 outwardly will allow the collar 20 to snap back into its elongated, linear position to be stored or transported for further use.

FIGS. 15-20 illustrate an embodiment which is similar to that shown in FIGS. 12-14, with the exception that connectors 50, 52 are utilized instead of magnets 34; with the connectors 50, 52 preferably comprising a hook-and-loop fastener material. The installation and removal process of the collar of FIGS. 15-20 is thus very similar to that of FIGS. 12-15, except that it is the connectors 50, 52 being connected to each other and removed from each other rather than magnets 34.

The collar 20 of this embodiment is connected by wrapping the collar 20 around the barbell 12 such that the first connector 50 engages with the second connector 52. This can be accomplished by grasping the collar 20 and applying pressure on the inner surface 22 of the collar 20 by the barbell 12. The connectors 50, 52 may be disengaged from each other by pulling outwardly on one of the ends 23, 24 of the collar 20. Continuing to pull the ends 23, 24 of the collar 20 apart from each other will snap the collar 20 into its elongated, linear position pending further use.

FIGS. 20-23 illustrate an embodiment without magnets 34 or connectors 50, 52. This embodiment is snapped onto or off of the barbell 12 in the same manner as the previously-discussed embodiments. The collar 20 may be grasped, such as at one of its ends 23, 24, and forced against the barbell 12 at any location along its inner surface 22. The collar 20 will wrap itself around the barbell 12 naturally as shown in FIG. 23, and the collar 20 may be released. Instead of being retained on the barbell 12 via magnets 34 or connectors 50, 52 the ribbon spring 32 will provide the force to curl the collar 20 and the outer covering 30 will provide frictional engagement both between the ends 23, 24 and the between the collar 20 and the barbell 12 as shown in FIG. 23.

FIGS. 24-29 illustrate an alternate embodiment which utilizes magnets 63, 67 positioned within housings 60, 64 at either end 23, 24 of the collar 20. In this embodiment, the first magnets 63 in the first housing 60 engage with the second magnets 67 in the second housing 64 to secure the collar 20 around the barbell 12.

This embodiment functions largely the same as the other embodiments. The collar 20 is installed on the barbell 12 by first grasping the collar 20 and then slapping it or forcing it against the barbell 12 such that the barbell 12 applies pressure on the inner surface 22 of the collar 20. This pressure will cause the collar 20 to naturally curl inwardly.

After the collar 20 is wrapped around the barbell 12, the ends 23, 24 of the collar 20 are pressed together as shown in FIG. 29 such that the first magnets 63 engage with the second magnets 67. This may naturally occur, or may be manually achieved by manipulating the collar 20 with one's hands.

To remove the collar 20 from the barbell 12, the handle 40 may be grasped and pulled outwardly. Alternatively, the sides 25, 26 of the collar 20 may be grasped and pulled outwardly. The outward pressure on the collar 20 will cause the collar 20 to snap back into its elongated position; with the tension connectors 68 aiding in reverting or snapping the collar 20 back into its elongated position from its curled position.

FIGS. 30 through 43 illustrate another alternative embodiment which includes a locking structure to selectively lock the first end 23 and the second end 24 of the collar 20 together with or without magnets. The collar 20 in FIGS. 30 through 43 is similar to the collar 20 discussed in the previous embodiments in that the collar 20 has a first end 23, a second end 24 opposite of the first end 23, an outer surface 21, an inner surface 22 opposite of the outer surface 21, a first side 25 and a second side 26 opposite of the first side 25. The collar 20 in FIGS. 30 through 43 also preferably includes, but not required, a ribbon spring 32 positioned within the collar 20 to applying a biasing force to keep the collar 20 curved when in the engaged position around the barbell 12 and to keep the collar 20 linear when in the released position. The collar 20 of FIGS. 30 through 40 is adjustable between an engaged position in which the first end and the second end of the collar 20 are each curled inwardly forming the collar into a circular shape to secure the collar around the barbell and a released position in which the collar is linear. The collar shown in FIGS. 30 through 43 preferably includes at least one first magnet 63 attached to the collar near the first end of the collar and at least one second magnet 67 attached to the collar near the second end of the collar wherein the first magnet is adapted to magnetically engage with the second magnet to removably connect the first end of the collar to the second end of the collar when the collar is in the engaged position so the inner surface frictionally engages the barbell. The magnets 63, 67 may not be positioned parallel with the inner and outer surfaces of the collar 20 and instead may be angled (see FIG. 40) so they are parallel to one another when the collar 20 is in the engaged position. Support members 76, 78 may be used beneath each of the magnets 63, 67 to help support the magnets 63, 67 at the desired angle. The collar 20 preferably includes an outer covering 30 that surrounds the ribbon spring 32 completely or partially. The outer covering 30 is preferably comprised of a flexible material such as, but not limited to, rubber.

As best illustrated in FIGS. 30, 34, 36 and 40, the collar 20 includes a first locking member 80 near the first end 23 of the collar 20 and a second locking member 70 near the second end 24 of the collar 20. The first locking member 80 and the second locking member 70 may be integrally formed within the outer covering or attached to the collar 20. The first locking member 80 selectively interlocks with the second locking member 70 to ensure that the magnets 63, 67 do not separate when the barbell 12 is in use (e.g. when the barbell and weights are dropped on a floor or lifted). During the performance of an exercise, the weights 14 (e.g. Olympic weight plates, standard weight plates, rubber weight plates, bumper plates, technique bumper weight plates, training bumper weight plates, competition bumper weight plates, powerlifting plates, etc.).

The first locking member 80 is adapted to be selectively engaged by the second locking member 70 when the collar 20 is in the engaged position to secure the first end 23 of the collar 20 to the second end 24 of the collar 30 in a locked state when the first magnet 63 is magnetically engaged with the second magnet 67.

Figure 33A:
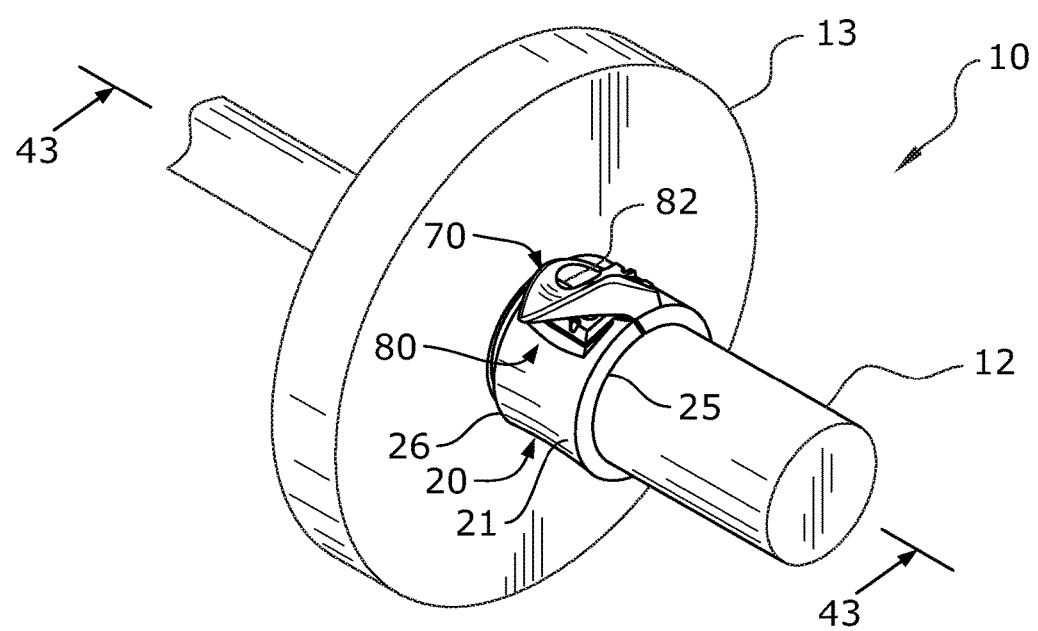
FIG. 33a is a perspective view of a barbell collar system fully attached upon the barbell to secure one or more weights on the barbell in accordance with a sixth example embodiment.
Figure 33B:
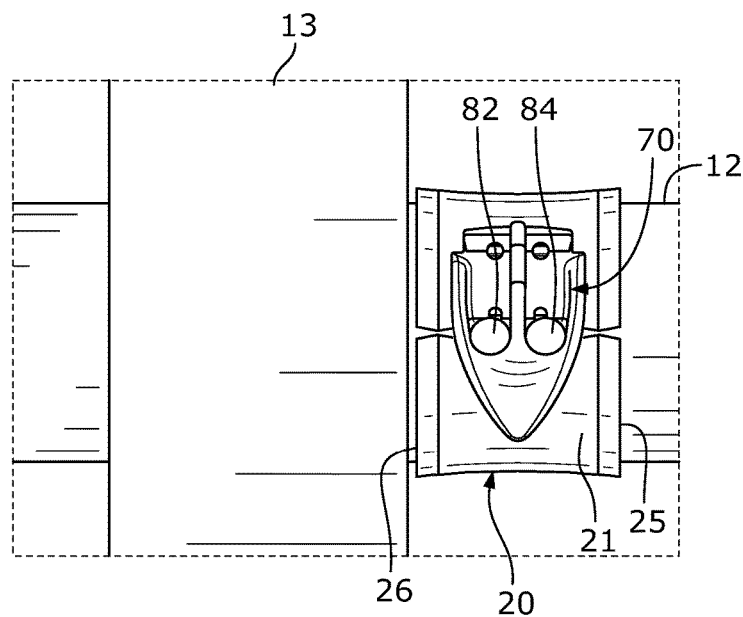
FIG. 33b is a top view of a barbell collar system fully attached upon the barbell to secure one or more weights on the barbell in accordance with a sixth example embodiment.
Figure 34:
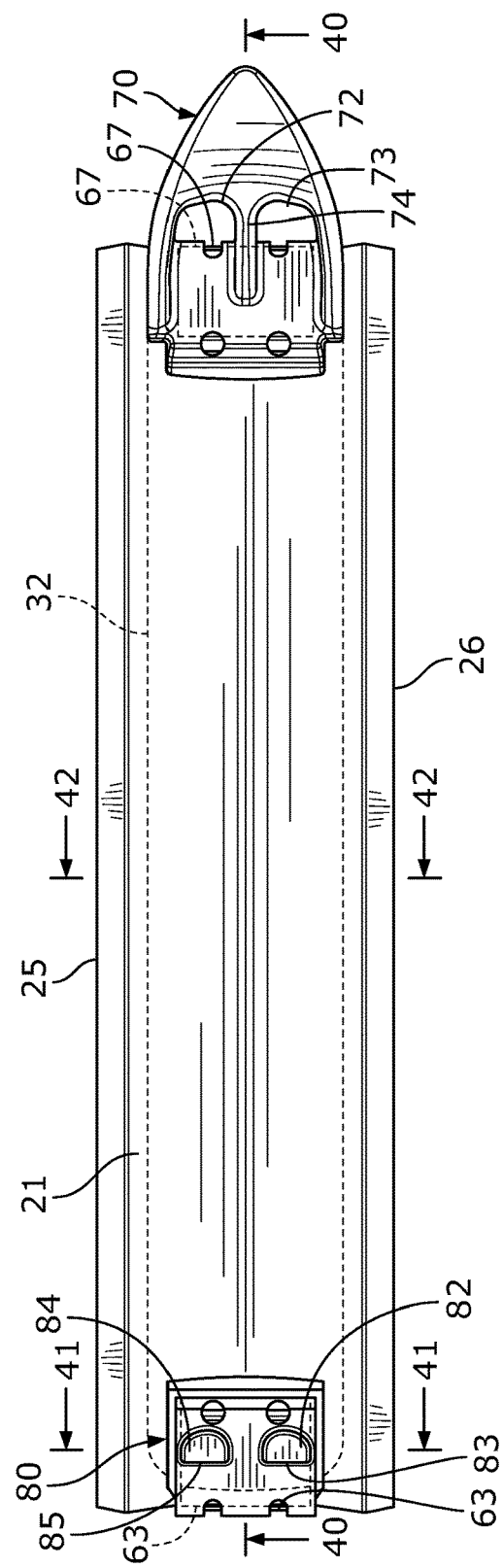
FIG. 34 is a top view of a barbell collar system in accordance with a sixth example embodiment.
Figure 35:
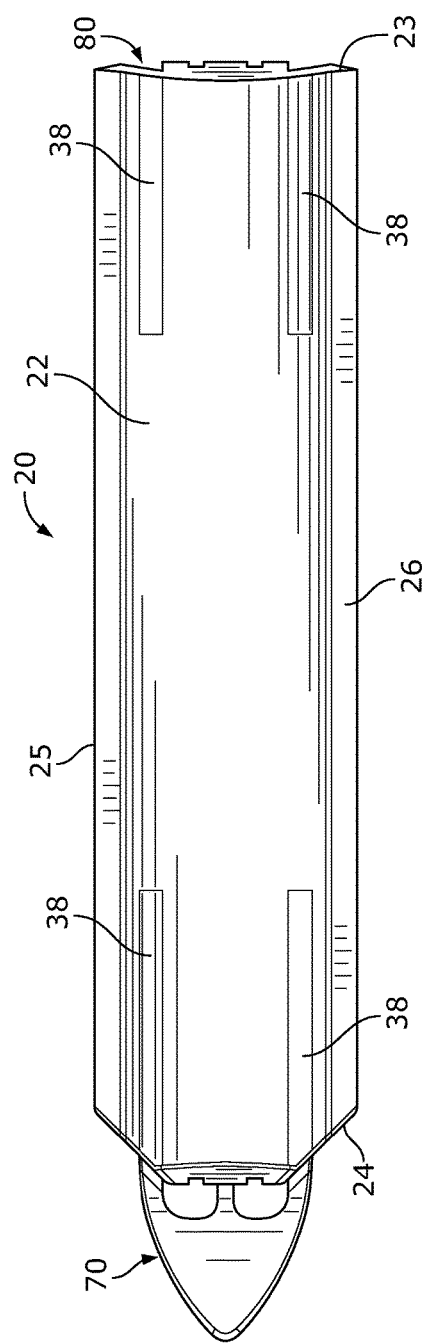
FIG. 35 is a bottom view of a barbell collar system in accordance with a sixth example embodiment.
Figure 36:
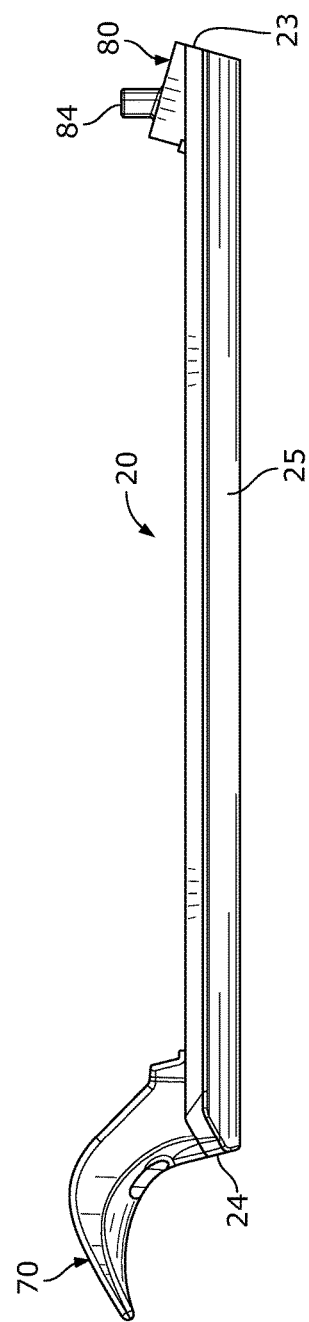
FIG. 36 is a side view of a barbell collar system in accordance with a sixth example embodiment.
Figure 37:
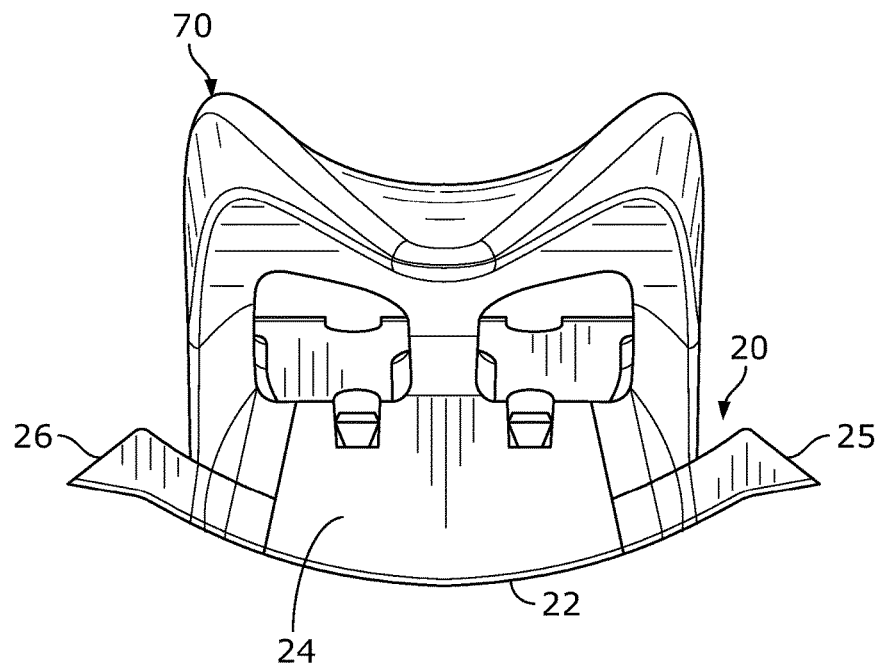
FIG. 37 is an end view from a second end of a barbell collar system in accordance with a sixth example embodiment.
Figure 38:
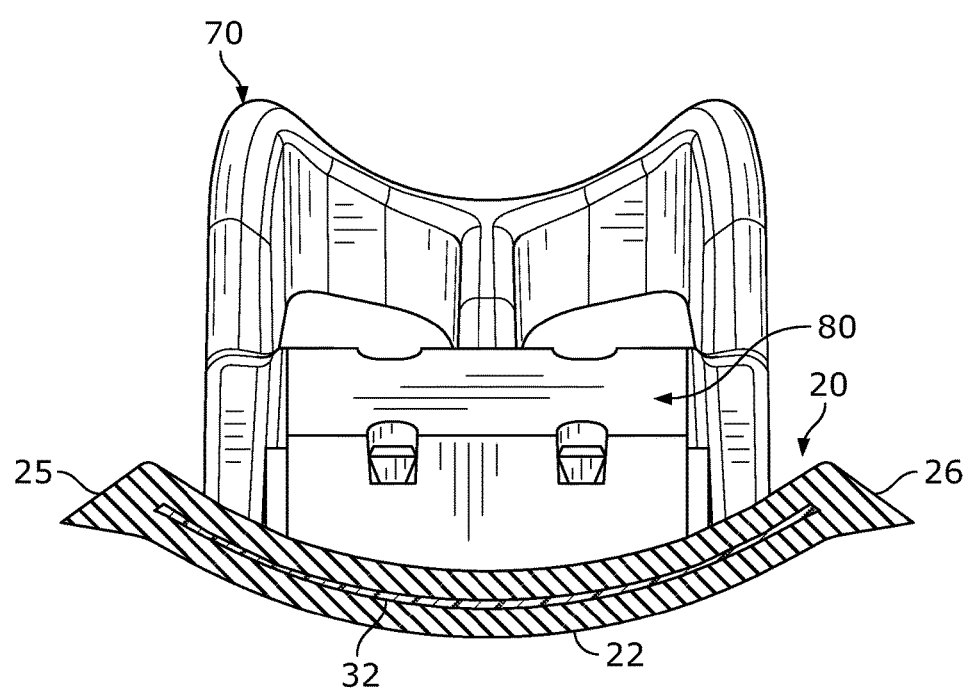
FIG. 38 is a cross sectional view of the barbell collar directed towards the second end of the barbell collar system of FIG. 37 in accordance with a sixth example embodiment.
Figure 39:
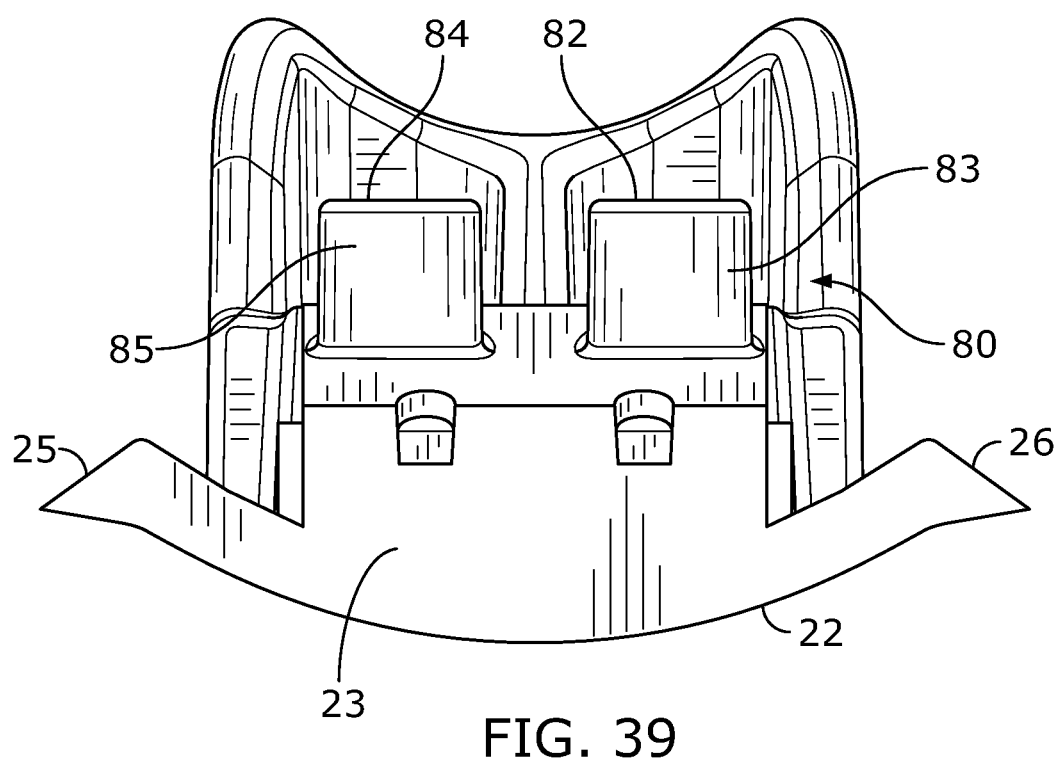
FIG. 39 is an end view from a first end of a barbell collar system in accordance with a sixth example embodiment.

In one embodiment, the second locking member 70 includes a first opening 72 and the first locking member 80 includes a first engaging member 82 as best illustrated in FIG. 34. The first opening 72 is adapted to selectively receive the first engaging member to selectively engage the first locking member 80 and the second locking member 70 together thereby preventing accidental loosening of the collar 20 with respect to the barbell 12 during usage of the barbell 12. The second locking member 70 may also include a second opening 73 and the first locking member 80 may include a second engaging member 84. The second opening 73 is adapted to selectively receive the second engaging member 84 to selectively engage the first locking member 80 and the second locking member 70 together. The second locking member 70 is preferably comprised of a handle that is stretchable and resilient so that when the second locking member 70 is engaged with the first locking member 80 a biasing force is applied to the ends 23, 24 of the collar 20 to keep the ends 23, 24 together when the collar is in the engaged position as shown in FIG. 33a of the drawings. The handle of the second locking member 70 may be integrally formed with the outer covering 30 wherein the outer covering is comprised of the same material as the handle. The handle is preferably tapered with an upper indentation for grasping with the fingers but other configurations for the handle may be used. The second locking member 70 preferably includes a center member 74 that separates the openings 72, 73. It can be appreciated that while two openings 72, 73 and two engaging members 82, 84 are discussed herein, that additional openings and engaging member may be used.

The first engaging member 82 and the second engaging member 84 preferably extend outwardly away from the outer surface of the collar. The first engaging member 82 and the second engaging member 84 preferably extend at an angle that is different from the angle of the first end 23. The first end 23 and the second end 24 of the collar 20 are preferably substantially planar and align substantially parallel to one another when adjacent to one another. The engaging members 82, 84 may include non-engaging sides that are not engaged with the second locking member 70 and may have a planar structure or other structure that reduces the size of the engaging members 82, 84.

Figure 33C:
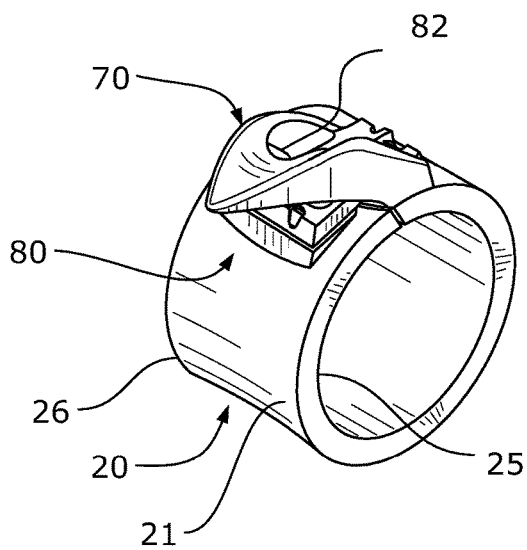
FIG. 33c is a perspective view of a barbell collar system in a closed circular state in accordance with a sixth example embodiment.
Figure 33D:
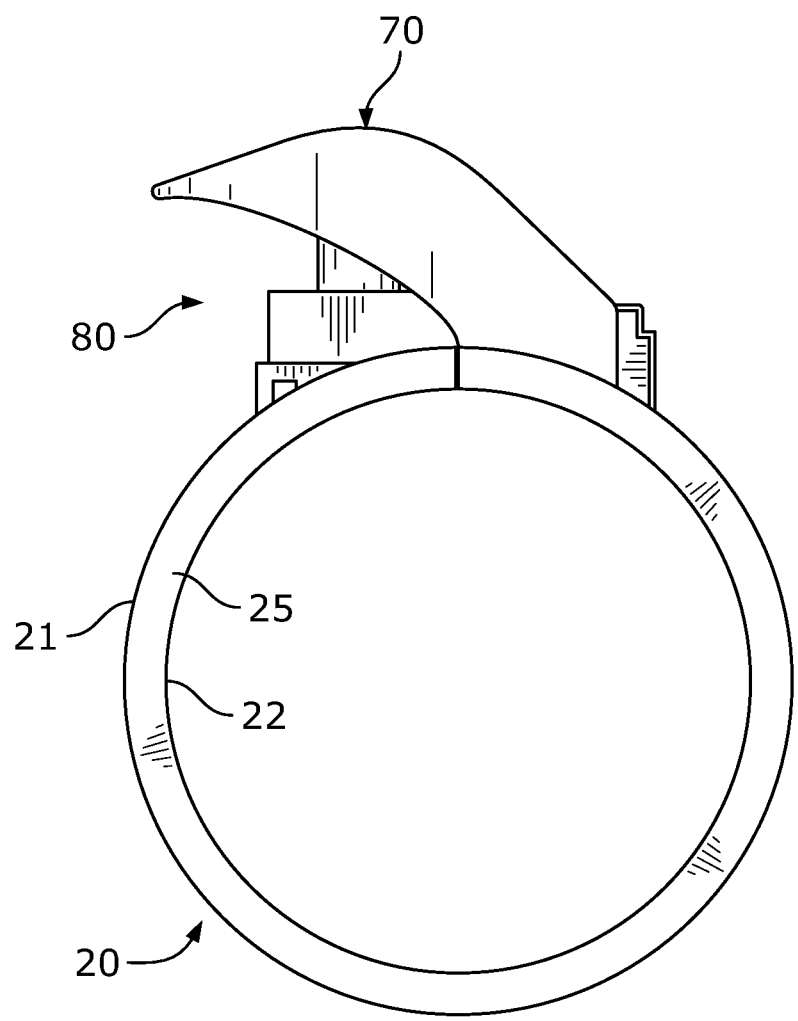
FIG. 33d is a perspective view of a barbell collar system fully attached upon the barbell to secure one or more weights on the barbell in accordance with a sixth example embodiment.

The first end 23 and the second end 24 of the collar 20 are formed to be aligned substantially parallel to one another when the collar 20 is in the engaged position as shown in FIG. 33c. In one embodiment, the first end 23 is angled upwardly and outwardly from the collar and the second end 24 is angled upwardly and outwardly from the collar so they are substantially parallel to one another when the collar 20 is wrapped around the barbell 12.

Figure 43:
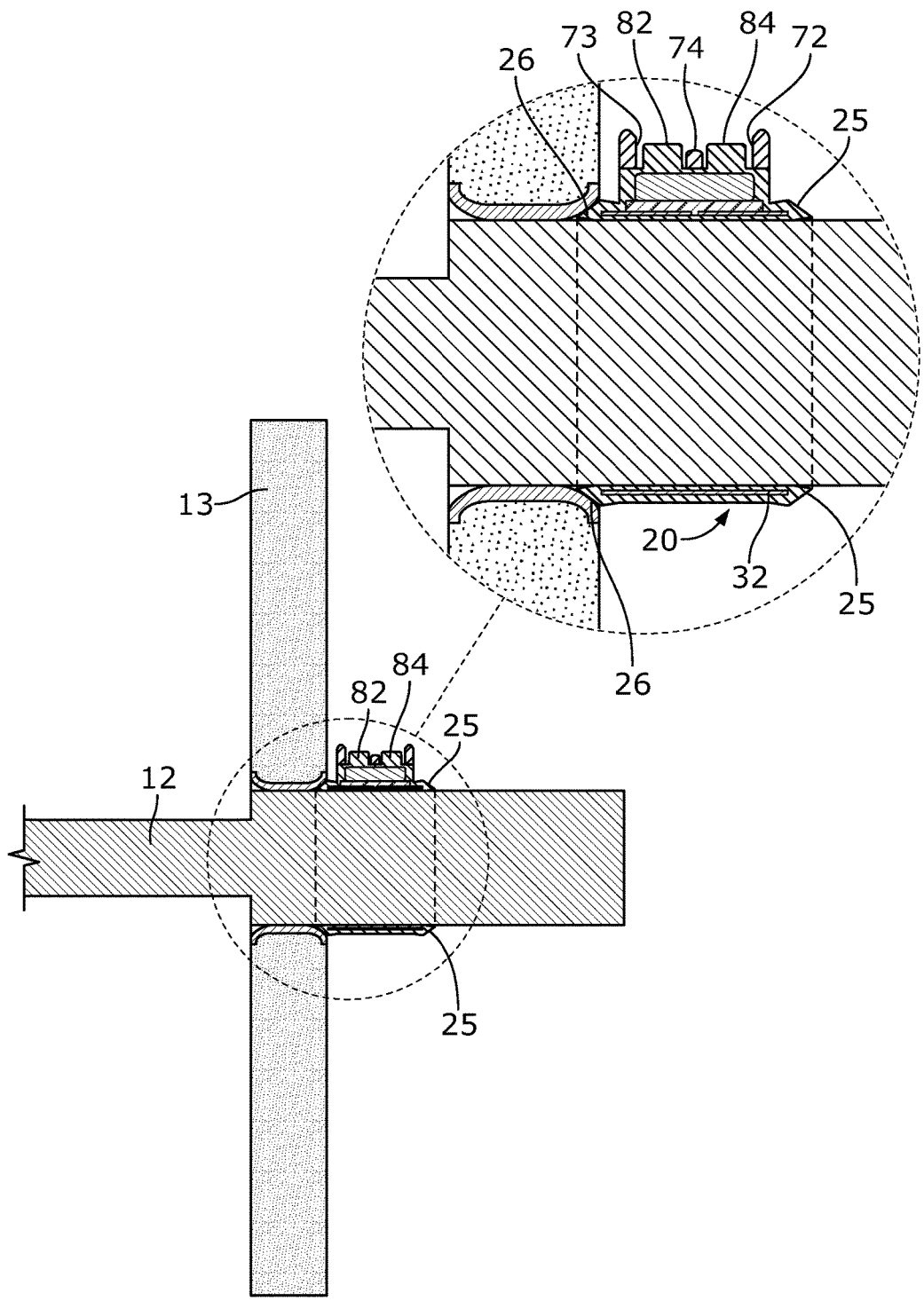

In an embodiment, the first side 25 of the collar 20 is preferably tapered outwardly so that a portion of the first side 25 is able to extend partially into the opening of the weight 13 when the weight 13 is positioned upon the barbell 12. The second side 26 of the collar 20 is also preferably tapered outwardly so that a portion of the second side 26 is able to extend partially into the opening of the weight 13 when the weight 13 is positioned upon the barbell 12 as illustrated in FIG. 43 of the drawings. The sides 25, 26 having a tapered structure creates a thin outer edge so that either side 25, 26 may be positioned adjacent to and touching the weight 13. When the weight 13 attempts to move outwardly upon the tapered side 25, 26 of the collar 20, the weight 13 forces the tapered side 25, 26 towards the barbell 12 thereby increasing the frictional resistance of the inner surface 22 of the collar 20 with respect to the barbell 12 to help prevent movement of the collar 20 with respect to the barbell 12. The tapered sides 25, 26 are preferably integrally formed from the outer covering 30. The more the weight 13 moves outwardly toward a distal end of the barbell 12, the more frictional resistance is created between the collar 20 and the barbell 12.

Figure 31:
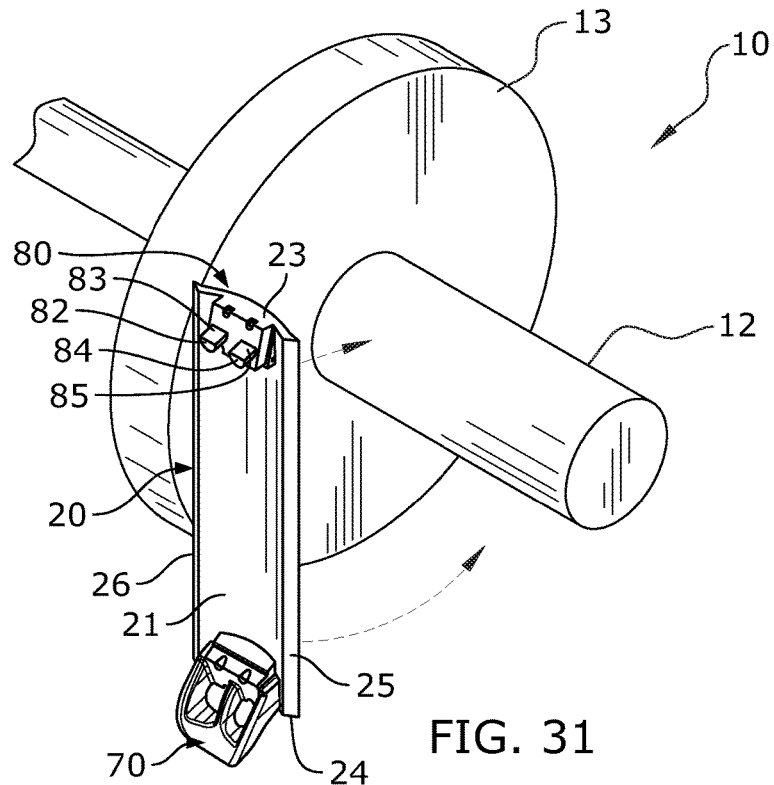
FIG. 31 is a perspective view of a barbell collar system prior to being positioned upon a barbell in accordance with a sixth example embodiment.
Figure 32:
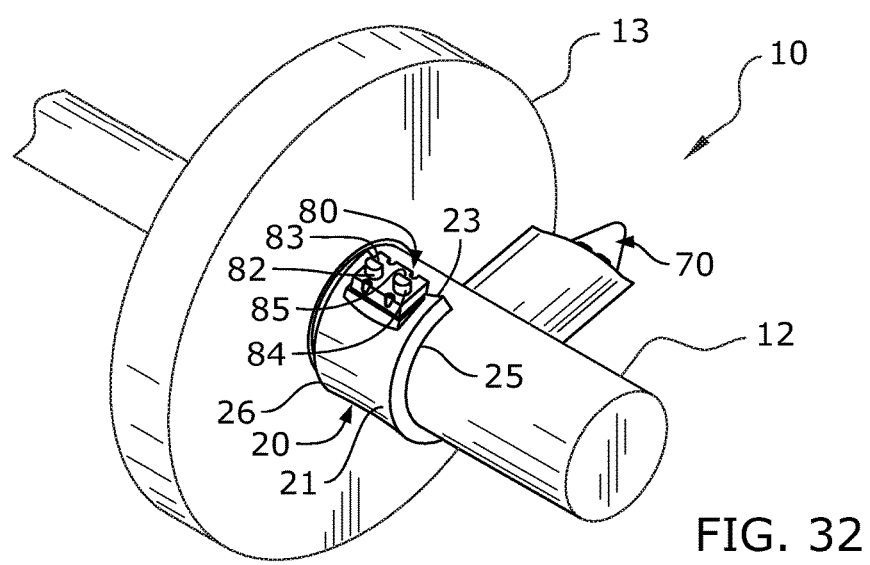
FIG. 32 is a perspective view of a barbell collar system partially attached upon the barbell in accordance with a sixth example embodiment.

In use of the embodiment shown in FIGS. 30 through 43, the user positions the collar 20 near the barbell 12 and then slaps the collar upon the barbell 12 resulting in the ribbon spring 32 collapsing into a curled state as shown in FIGS. 31 and 32 of the drawings. After the first end 23 and the second end 24 of the collar 20 are positioned adjacent to one another (and possibly touching), the user then pulls upon the second locking member 70 to stretch the second locking member 70 until the openings 72, 73 are aligned with the engaging members 82, 84. The user then pushes the second locking member 70 downwardly upon the first locking member 80 until the engaging members 82, 84 are catchably engaged within the openings 72, 73. The force of the magnets 63, 67 combined with the force of the stretched second locking member 70 engaged with the first locking member 80 results in a combined force that increases the frictional resistance of the collar 20 upon the barbell 12 and that prevents accidental separation of the ends 23, 24 during the performance of an exercise. The tapered sides 25, 26 of the collar further increase the frictional resistance of the collar 20 upon the barbell 12 when the weight 13 attempts to move outwardly toward the distal end of the barbell 12 as shown in FIG. 43. When the exerciser needs to remove or add a weight 13 to the barbell 12, the exerciser releases the second locking member 70 from the first locking member 80 and then pulls the collar 20 off the barbell 12 to allow for the addition or removal of weights 13. The above process is repeated to secure the weights 13 on the barbell another time.

Unless otherwise defined, all technical and scientific terms used herein have the same meaning as commonly understood by one of ordinary skill in the art to which this invention belongs. Although methods and materials similar to or equivalent to those described herein can be used in the practice or testing of the barbell collar system, suitable methods and materials are described above. All publications, patent applications, patents, and other references mentioned herein are incorporated by reference in their entirety to the extent allowed by applicable law and regulations. The barbell collar system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A barbell collar for selectively securing a weight onto a barbell, comprising:
   a collar having a first end, a second end opposite of the first end, an outer surface, an inner surface opposite of the outer surface, a first side and a second side opposite of the first side, wherein the inner surface is adapted to frictionally engage the barbell;
   a ribbon spring positioned within the collar;
   wherein the collar is adjustable between an engaged position in which the first end and the second end of the collar are each curled inwardly forming the collar into a circular shape to secure the collar around the barbell and a released position in which the collar is linear;
   a first magnet attached to the collar near the first end of the collar; and
   a second magnet attached to the collar near the second end of the collar;
   wherein the first magnet is adapted to magnetically engage with the second magnet to removably connect the first end of the collar to the second end of the collar when the collar is in the engaged position so the inner surface frictionally engages the barbell;
   wherein the collar includes a first locking member near the first end of the collar and a second locking member near the second end of the collar, wherein the first locking member is selectively engaged by the second locking member to secure the first end of the collar to the second end of the collar in a locked state when the first magnet is magnetically engaged with the second magnet.

2. The barbell collar of claim 1, wherein the collar includes an outer covering that surrounds the ribbon spring.

3. The barbell collar of claim 2, wherein the outer covering is comprised of a flexible material.

4. The barbell collar of claim 3, wherein the outer covering is comprised of rubber.

5. The barbell collar of claim 2, wherein the first locking member is integrally formed within the outer covering.

6. The barbell collar of claim 5, wherein the second locking member is integrally formed within the outer covering.

7. The barbell collar of claim 1, wherein the second locking member includes a first opening and wherein the first locking member includes a first engaging member, wherein the first opening selectively receives the first engaging member to selectively engage the first locking member and the second locking member together.

8. The barbell collar of claim 7, wherein the second locking member includes a second opening and wherein the first locking member includes a second engaging member, wherein the second opening selectively receives the second engaging member to selectively engage the first locking member and the second locking member together.

9. The barbell collar of claim 8, wherein the second locking member is comprised of a handle.

10. The barbell collar of claim 9, wherein the handle is stretchable and resilient.

11. The barbell collar of claim 10, wherein the handle is integrally formed with the outer covering.

12. The barbell collar of claim 11, wherein the first engaging member and the second engaging member extend outwardly away from the outer surface of the collar.

13. The barbell collar of claim 12, wherein the handle is tapered.

14. The barbell collar of claim 1, wherein the first end and the second end are formed to be aligned substantially parallel to one another when the collar is in the engaged position.

15. The barbell collar of claim 14, wherein the first end is angled upwardly and outwardly from the collar and the second end is angled upwardly and outwardly from the collar.

16. The barbell collar of claim 1, wherein the first side of the collar is tapered outwardly.

17. The barbell collar of claim 16, wherein the second side of the collar is tapered outwardly.

18. The barbell collar of claim 17, wherein the first side and the second side of the collar each have a thin outer edge.

19. The barbell collar of claim 1, wherein the first side of the collar has an outer portion that is thin enough to extend into an opening of a weight positioned upon the barbell.

20. The barbell collar of claim 1, wherein the first side and the second side of the collar each has an outer portion that is thin enough to extend into an opening of a weight positioned upon the barbell.

* * * * *